(12) United States Patent
Shida

(10) Patent No.: US 8,594,920 B2
(45) Date of Patent: Nov. 26, 2013

(54) VEHICLE RELATIVE POSITION ESTIMATION APPARATUS AND VEHICLE RELATIVE POSITION ESTIMATION METHOD

(75) Inventor: Mitsuhisa Shida, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/999,172

(22) PCT Filed: Feb. 27, 2009

(86) PCT No.: PCT/JP2009/053720
§ 371 (c)(1),
(2), (4) Date: Dec. 15, 2010

(87) PCT Pub. No.: WO2010/097943
PCT Pub. Date: Sep. 2, 2010

(65) Prior Publication Data
US 2011/0301779 A1    Dec. 8, 2011

(51) Int. Cl.
*G05D 1/02* (2006.01)
(52) U.S. Cl.
USPC ............. 701/300; 701/480; 342/357.34
(58) Field of Classification Search
USPC ............ 701/300, 408, 480, 536; 342/357.34
See application file for complete search history.

(56) References Cited

U.S. PATENT DOCUMENTS

| | | | |
|---|---|---|---|
| 5,680,122 A | 10/1997 | Mio | |
| 5,757,317 A * | 5/1998 | Buchler et al. | 342/357.31 |
| 6,067,031 A * | 5/2000 | Janky et al. | 340/903 |
| 7,702,460 B2 * | 4/2010 | Liu et al. | 701/480 |
| 2005/0225477 A1 | 10/2005 | Cong et al. | |
| 2007/0016371 A1 * | 1/2007 | Waid et al. | 701/213 |
| 2008/0114544 A1 * | 5/2008 | Liu et al. | 701/213 |

(Continued)

FOREIGN PATENT DOCUMENTS

| | | |
|---|---|---|
| EP | 1 868 008 A1 | 12/2007 |
| EP | 1 898 232 A1 | 3/2008 |

(Continued)

OTHER PUBLICATIONS

Jun. 6, 2012 European Search Report issued in European Patent Application No. 09840796.8.

(Continued)

*Primary Examiner* — Helal A Algahaim
*Assistant Examiner* — Yuri Kan
(74) *Attorney, Agent, or Firm* — Oliff & Berridge, PLC

(57) ABSTRACT

A vehicle relative position estimation apparatus includes: a motional state acquiring unit that acquires vehicle control information for controlling the motional state of a vehicle or the motional state of the vehicle detected by an in-vehicle apparatus of the vehicle, and vehicle control information for controlling the motional state of another vehicle or the motional state of another vehicle detected by an in-vehicle apparatus of another vehicle; a relative position acquiring unit that acquires the relative position detected by the in-vehicle apparatus provided in the vehicle or another vehicle; an estimation unit that receives the vehicle control information or the motional state of the vehicle, and the vehicle control information or the motional state of another vehicle acquired by the motional state acquiring unit and estimates the relative position with a Kalman filter using the relative position acquired by the relative position acquiring unit as the amount of observation.

6 Claims, 19 Drawing Sheets

(56) References Cited

U.S. PATENT DOCUMENTS

2008/0306666 A1 12/2008 Zeng et al.
2009/0005959 A1* 1/2009 Bargman et al. ............. 701/117
2010/0099353 A1 4/2010 Komori

FOREIGN PATENT DOCUMENTS

| JP | A 9-081899 | 3/1997 |
| JP | A 2006-090957 | 4/2006 |
| JP | A 2006-285695 | 10/2006 |
| JP | A 2008-225786 | 9/2008 |

OTHER PUBLICATIONS

International Search Report issued in PCT/JP2009/053720, mailed May 12, 2009. (with English-language translation).

* cited by examiner (a)

(b)

(c)

(a)

(b)

(a)

(b)

VEHICLE RELATIVE POSITION ESTIMATION APPARATUS AND VEHICLE RELATIVE POSITION ESTIMATION METHOD

TECHNICAL FIELD

The present invention relates to an apparatus and method of estimating the relative position between vehicles.

BACKGROUND ART

An apparatus has been known which acquires traveling data of a forward vehicle in order to perform vehicle control. For example, Patent Literature 1 discloses an apparatus that performs inter-vehicle communication with a forward vehicle to acquire traveling data, such as the vehicle speed, acceleration, and ID (order in a formation) of the forward vehicle, acquires the lateral displacement of the subject vehicle using a magnetic sensor provided in the subject vehicle, and performs formation traveling on the basis of the acquired information.

Patent Literature 1: Japanese Unexamined Patent Application Publication No. 09-81899

SUMMARY OF INVENTION

Technical Problem

However, when the vehicle travels taking into consideration other vehicles, such as during formation traveling, it is necessary to control the distance between the vehicles. Therefore, it is preferable to accurately acquire the relative position (or the relative velocity or relative acceleration) between the vehicles. However, in the apparatus disclosed in Patent Literature 1, the accuracy of the acceleration acquired by communication is not guaranteed. Therefore, there is a concern that the accuracy of the relative position between the vehicles will be reduced due to, for example, an error in the acceleration sensor of the preceding vehicle.

A technique for observing an inter-vehicle distance (relative position) using a relative position detection sensor provided in the vehicle is also considered. However, in this case, since sensor information includes, for example, noise and a measurement error, it may be difficult to accurately detect the relative position between the vehicles according to the performance of the relative position detection sensor.

The invention has been made in order to solve the above-mentioned problems of the related art, and an object of the invention is to provide a vehicle relative position estimation apparatus capable of accurately estimating the relative position between vehicles.

Solution to Problem

That is, according to an aspect of the invention, there is provided a vehicle relative position estimation apparatus that estimates the position of a first vehicle relative to a second vehicle. The vehicle relative position estimation apparatus includes: a motional state acquiring unit that acquires vehicle control information for controlling the motional state of the first vehicle or the motional state of the first vehicle detected by an in-vehicle apparatus of the first vehicle, and vehicle control information for controlling the motional state of the second vehicle or the motional state of the second vehicle detected by an in-vehicle apparatus of the second vehicle; a relative position acquiring unit that acquires the relative position detected by the in-vehicle apparatus provided in the first vehicle or the second vehicle; and an estimation unit that receives the vehicle control information or the motional state of the first vehicle and the vehicle control information or the motional state of the second vehicle acquired by the motional state acquiring unit, and estimates the relative position with a Kalman filter, using the relative position acquired by the relative position acquiring unit as the amount of observation.

In the above-mentioned aspect, the motional state acquiring unit acquires the vehicle control information for controlling the motional state of the first vehicle or the motional state of the first vehicle detected by the in-vehicle apparatus of the first vehicle, and the vehicle control information for controlling the motional state of the second vehicle or the motional state of the second vehicle detected by the in-vehicle apparatus of the second vehicle. The relative position acquiring unit acquires the relative position detected by the in-vehicle apparatus provided in the first vehicle or the second vehicle. The estimation unit receives the vehicle control information or the motional state of the first vehicle and the vehicle control information or the motional state of the second vehicle, and estimates the relative position with the Kalman filter, using the relative position acquired by the relative position acquiring unit as the amount of observation. As such, a single apparatus can combine the relative position with a large measurement error and noise, which is obtained from the in-vehicle apparatus provided in the first vehicle or the second vehicle, with the motional state of the first vehicle and the second vehicle using the Kalman filter. Therefore, it is possible to estimate a relative position with, for example, a small measurement error and noise. As a result, it is possible to accurately estimate the relative position between the vehicles.

The motional state acquiring unit may acquire acceleration as the motional state, and the relative position acquiring unit may use GPS information as the relative position.

According to this structure, it is possible to combine the relative position calculated from the GPS information including, for example a measurement error and noise with the acceleration of the first and second vehicles using the Kalman filter. Therefore, it is possible to estimate a relative position with, for example, a small measurement error and noise.

The estimation unit may change the degree of fusion by the Kalman filter in correspondence with the capture state of the in-vehicle apparatus that is provided in the first vehicle or the second vehicle and detects the relative position.

According to this structure, since the degree of fusion by the Kalman filter can be changed in correspondence with the capture state of the in-vehicle apparatus, it is possible to reflect the capture state of the in-vehicle apparatus detecting the relative position to the estimated value of the relative position. Therefore, for example, even when one of a plurality of in-vehicle apparatuses cannot detect the relative position due to an unexpected situation, it is possible to calculate the estimated value. As a result, it is possible to improve the availability of the vehicle relative position estimation apparatus.

The estimation unit may change the gain of the Kalman filter that is calculated in advance, in correspondence with the capture state of the in-vehicle apparatus that is provided in the first vehicle or the second vehicle and detects the relative position.

In a case in which the estimation unit changes the degree of fusion by the Kalman filter in correspondence with the capture state of the in-vehicle apparatus, when the relative position acquiring unit cannot acquire the relative position from the in-vehicle apparatus that is provided in the first vehicle or the second vehicle and detects the relative position, the estimation unit may estimate the relative position on the basis of the vehicle control information or the motional state of the first vehicle and the vehicle control information or the motional state of the second vehicle acquired by the motional state acquiring unit.

According to the above-mentioned structure, when none of the in-vehicle apparatuses detecting the relative position can detect the relative position for a predetermined period of time, the estimation unit can estimate the relative position on the basis of the vehicle control information or the motional state. Therefore, it is possible to improve the availability of the vehicle relative position estimation apparatus.

The vehicle relative position estimation apparatus according to the above-mentioned aspect may further include a control unit that changes a target relative position of the first vehicle or the second vehicle on the basis of the accuracy of the in-vehicle apparatus that is provided in the first vehicle and detects the motional state of the first vehicle or the accuracy of the in-vehicle apparatus that is provided in the second vehicle and detects the motional state of the second vehicle, when the relative position acquiring unit cannot acquire the relative position from the in-vehicle apparatus that is provided in the first vehicle or the second vehicle and detects the relative position and the estimation unit estimates the relative position on the basis of the motional state of the first vehicle and the motional state of the second vehicle.

According to this structure, when the in-vehicle apparatus does not detect the relative position and the relative position is estimated from the motional state, the control unit can change the target relative position considering, for example, the measurement error and noise of the in-vehicle apparatuses that are provided in the first vehicle and the second vehicle and detect the motional state. Therefore, it is possible to ensure the safety of traveling.

According to another aspect of the invention, there is provided a vehicle relative position estimation method that estimates the position of a first vehicle relative to a second vehicle. The vehicle relative position estimation method includes: a motional state acquiring step of acquiring vehicle control information for controlling the motional state of the first vehicle or the motional state of the first vehicle detected by an in-vehicle apparatus of the first vehicle and vehicle control information for controlling the motional state of the second vehicle or the motional state of the second vehicle detected by an in-vehicle apparatus of the second vehicle; a relative position acquiring step of acquiring the relative position detected by the in-vehicle apparatus provided in the first vehicle or the second vehicle; and an estimation step of receiving the vehicle control information or the motional state of the first vehicle and the vehicle control information or the motional state of the second vehicle acquired in the motional state acquiring step, and estimating the relative position with a Kalman filter using the relative position acquired in the relative position acquiring step as the amount of observation.

In the motional state acquiring step, acceleration may be acquired as the motional state, and in the relative position acquiring step, GPS information may be used as the relative position.

In the estimation step, the degree of fusion by the Kalman filter may be changed in correspondence with the capture state of the in-vehicle apparatus that is provided in the first vehicle or the second vehicle and detects the relative position.

The vehicle relative position estimation method has the same effect as the vehicle relative position estimation apparatus.

Advantageous Effects of Invention

According to the invention, it is possible to accurately estimate the relative position between vehicles.

REFERENCE SIGNS LIST

Figure 1:
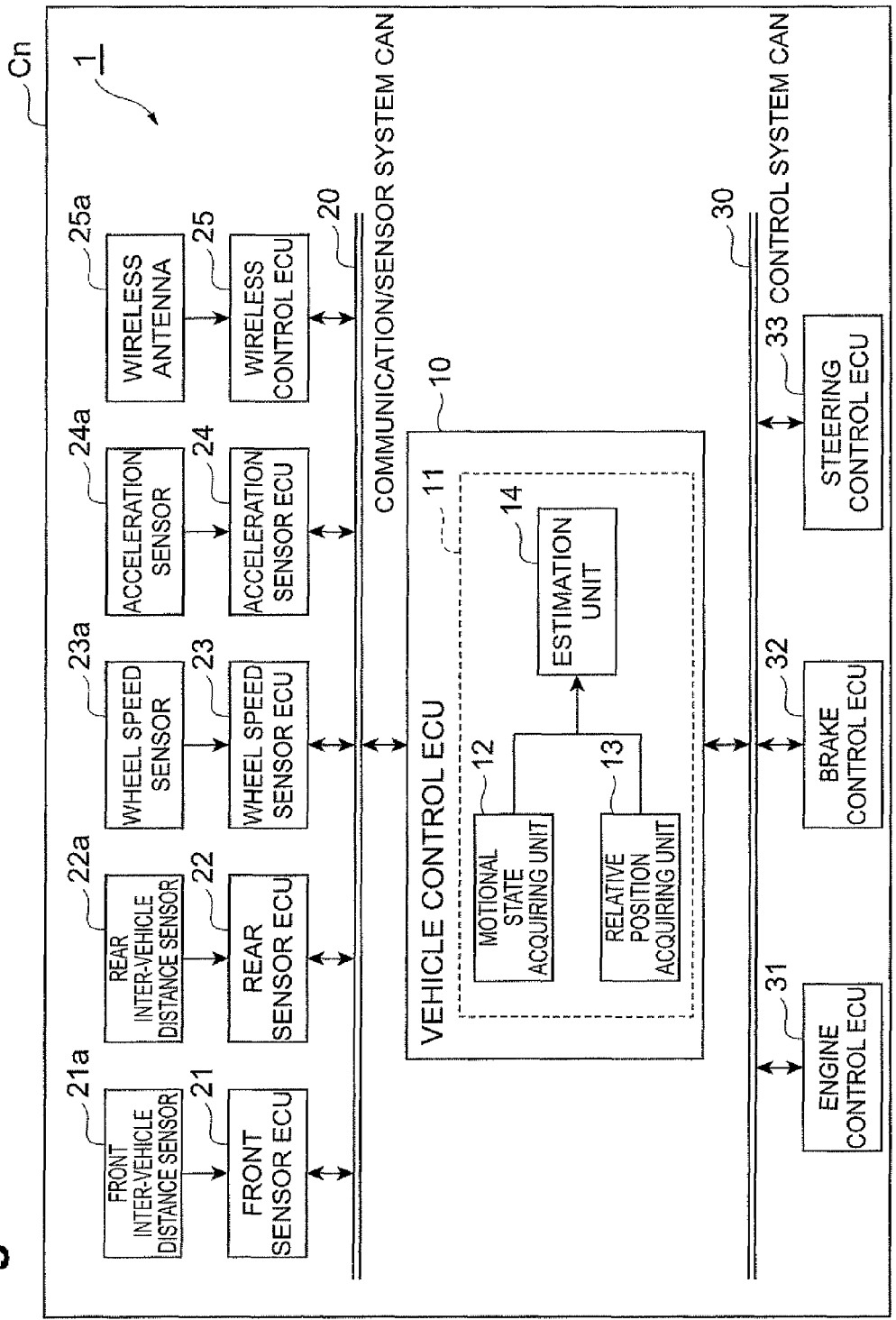
FIG. 1 is a diagram schematically illustrating the structure of a formation traveling system including a vehicle relative position estimation apparatus according to a first embodiment.

1: VEHICLE FORMATION CONTROL SYSTEM
10: VEHICLE CONTROL ECU

11: VEHICLE RELATIVE POSITION ESTIMATION APPARATUS
12: MOTIONAL STATE ACQUIRING UNIT
13: RELATIVE POSITION ACQUIRING UNIT
14: ESTIMATION UNIT

DESCRIPTION OF EMBODIMENTS

Hereinafter, exemplary embodiments of the invention will be described with reference to the accompanying drawings. In all of the drawings, the same or equivalent components are denoted by the same reference numerals and a description thereof will be omitted.

First Embodiment

A vehicle relative position estimation apparatus according to this embodiment estimates the relative position (distance) between the vehicles, and is appropriately used in, for example, a vehicle formation control system in which a plurality of vehicles travels in a formation.

First, the outline of the vehicle formation control system will be described. A vehicle formation control system 1 shown in FIG. 1 controls the traveling state of the vehicle belonging to a formation in the formation traveling mode in which a plurality of vehicles travels in a formation. For example, as shown in FIG. 2, the formation mode in which an arbitrary number of vehicles travels in a line at a relatively short inter-vehicle distance is achieved by the vehicle formation control system 1.

Figure 2:
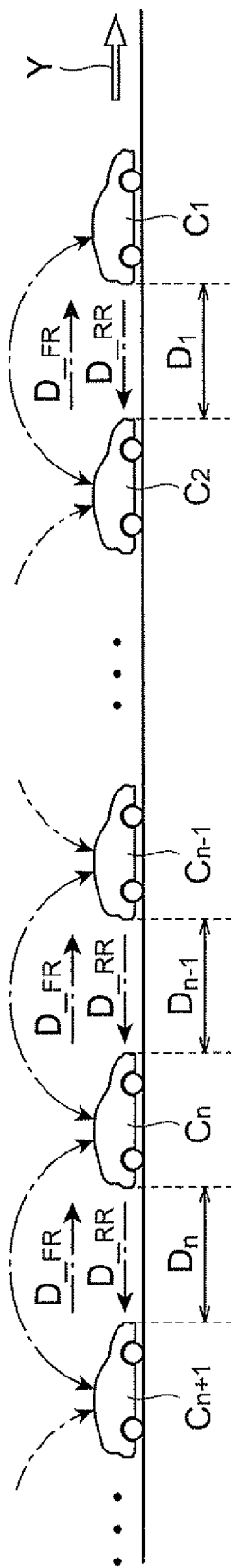
FIG. 2 is a diagram schematically illustrating the formation traveling system including the vehicle relative position estimation apparatus according to the first embodiment.

In the following description, as shown in FIG. 2, an n-th (n is a natural number) vehicle from the head of the formation is represented by "$C_n$". It is assumed that each vehicle travels in the direction of an arrow Y in FIG. 2 and a total number of vehicles in the formation is m (m is a natural number; m≥n). The distance between the vehicle $C_n$ and a vehicle $C_{n+1}$ is represented by "$D_n$".

All of the vehicles forming the formation shown in FIG. 2 are provided with the vehicle formation control system 1, which will be described below. In the following description, the vehicle $C_n$ is given as an example.

As shown in FIG. 1, the vehicle formation control system 1 includes a vehicle control ECU (Electronic Control Unit) 10. The vehicle control ECU 10 is an electronic control unit that controls the overall operation of the vehicle formation control system 1. For example, the vehicle control ECU 10 is mainly a computer including a CPU, a ROM, and a RAM. The function of the vehicle control ECU 10 will be described in detail below.

In addition, the vehicle formation control system 1 includes sensors (in-vehicle apparatuses) for detecting the traveling state of the vehicle (vehicle $C_n$). The sensors include, for example, a front inter-vehicle distance sensor 21a, a rear inter-vehicle distance sensor 22a, a wheel speed sensor 23a, and an acceleration sensor 24a. The front inter-vehicle distance sensor 21a is connected to a front sensor ECU 21, the rear inter-vehicle distance sensor 22a is connected to a rear sensor ECU 22, the wheel speed sensor 23a is connected to a wheel speed sensor ECU 23, and the acceleration sensor 24a is connected to an acceleration sensor ECU 24, such that the signals acquired by the sensors can be processed.

The front inter-vehicle distance sensor 21a and the front sensor ECU 21 have a function of detecting an inter-vehicle distance $D\_{FR}$ from a vehicle $C_{n-1}$ that travels ahead of the vehicle $C_n$. Similarly, the rear inter-vehicle distance sensor 22a and the rear sensor ECU 22 has a function of detecting an inter-vehicle distance $D\_{RR}$ from the vehicle $C_{n+1}$ that travels immediately behind the vehicle $C_n$. For example, millimeter-wave radars provided on the front and rear sides of the vehicle $C_n$ are used as the front inter-vehicle distance sensor 21a and the rear inter-vehicle distance sensor 22a. For example, the front inter-vehicle distance sensor 21a and the rear inter-vehicle distance sensor 22a have a function of transmitting electromagnetic waves, such as millimeter waves, to perform scanning in the left-right direction and receiving reflected waves. The front sensor ECU 21 and the rear sensor ECU 22 have a function of calculating the inter-vehicle distances $D\_{RR}$ and $D\_{FR}$ on the basis of the time from the transmission of the electromagnetic waves to the reception thereof. The front sensor ECU 21 and the rear sensor ECU 22 have a function of outputting the inter-vehicle distances $D\_{RR}$ and $D\_{FR}$ as inter-vehicle distance information to the vehicle control ECU 10. The detected inter-vehicle distances $D\_{RR}$ and $D\_{FR}$ include, for example, errors such as measurement accuracy, operation accuracy, and noise.

The wheel speed sensor 23a and the wheel speed sensor ECU 23 have a function of detecting the wheel speed $Vh_n$ of the vehicle $C_n$. For example, an electromagnetic pick-up sensor that detects the rotation of the wheel as a pulse signal is used as the wheel speed sensor 23a. For example, the wheel speed sensor 23a has a function of outputting the pulse signal generated by the rotation of the wheel to the wheel speed sensor ECU 23. The wheel speed sensor ECU 23 has a function of calculating the wheel speed $Vh_n$ on the basis of the pulse signal. The wheel speed sensor ECU 23 has a function of outputting the wheel speed $Vh_n$ as wheel speed information to the vehicle control ECU 10. The detected wheel speed $Vh_n$ includes errors such as measurement accuracy, operation accuracy, and noise.

The acceleration sensor 24a and the acceleration sensor ECU 24 have a function of detecting the acceleration $a_n$ of the vehicle $C_n$. For example, a gas rate sensor or a gyro sensor is used as the acceleration sensor 24a. For example, the acceleration sensor 24a has a function of outputting a signal indicating the displacement of the vehicle caused by acceleration to the acceleration sensor ECU 24. The acceleration sensor ECU 24 has a function of calculating the acceleration $a_n$ on the basis of the signal. The acceleration sensor ECU 24 has a function of outputting the acceleration $a_n$ as acceleration information to the vehicle control ECU 10. The detected acceleration $a_n$ includes errors such as measurement accuracy, operation accuracy, and noise.

The front sensor ECU 21, the rear sensor ECU 22, the wheel speed sensor ECU 23, and the acceleration sensor ECU 24 are connected to the vehicle control ECU 10 through a communication/sensor system CAN 20 that is constructed as an in-vehicle network.

As described above, in the vehicle formation control system 1, the sensors provided in the vehicle $C_n$ detect front inter-vehicle distance information, rear inter-vehicle distance information, wheel speed information, and acceleration information of the vehicle $C_n$. In the following description, in some cases, the front inter-vehicle distance information, the rear inter-vehicle distance information, the wheel speed information, and the acceleration information are referred to as traveling state information.

In addition, the system 1 includes an engine control ECU 31, a brake control ECU 32, and a steering control ECU 33 in order to control the acceleration and steering of the vehicle $C_n$. The engine control ECU 31, the brake control ECU 32, and the steering control ECU 33 are connected to the vehicle control ECU 10 through a control system CAN 30.

The engine control ECU 31 has a function of receiving acceleration request value information output from the vehicle control ECU 10 and operating, for example, a throttle actuator in correspondence with the acceleration request value. The brake control ECU 32 has a function of receiving the acceleration request value information and operating, for example, a brake actuator in correspondence with the acceleration request value. The steering control ECU 33 has a function of receiving steering command value information output from the vehicle control ECU 10 and operating, for example, a steering actuator in correspondence with the steering command value. The acceleration request value information and the steering command value information output from the vehicle control ECU 10 will be described in detail below.

In addition, the vehicle formation control system 1 includes a wireless antenna 26a and a wireless control ECU 26 in order to exchange, for example, traveling state information with vehicles belonging to another formation. Each of the vehicles in the formation performs inter-vehicle communication using the wireless antenna 26a and the wireless control ECU 26 to acquire, for example, vehicle specification information, traveling state information, acceleration request value information, and steering command value information of all of the vehicles belonging to another formation and transmit, for example, the vehicle specification information, traveling state information, acceleration request value information, and steering command value information of the vehicle $C_n$ to another vehicle (a dashed line in FIG. 2). The inter-vehicle communication makes it possible to exchange various kinds of information between the vehicles, as well as the above-mentioned information. The inter-vehicle communication enables the vehicle control ECUs 10 of all the vehicles to share the vehicle specification information, traveling state information, and acceleration request value information of the vehicles. The wireless control ECU 26 is connected to the vehicle control ECU 10 through the communication/sensor system CAN 20.

Details of the vehicle control ECU 10 will be described below. The vehicle control ECU 10 has a function of autonomously controlling, for example, the inter-vehicle distance $D_{n-1}$ from the front vehicle $C_{n-1}$ or the inter-vehicle distance $D_n$ from the rear vehicle $C_{n+1}$ on the basis of the traveling state information or the acceleration request value information obtained by the sensors of the vehicle $C_n$ and the traveling state information or the acceleration request value information of other vehicles obtained by the inter-vehicle communication. For example, the vehicle control ECU 10 has a function of generating acceleration request value information and steering command value information such that the inter-vehicle distances $D_{n-1}$ and $D_n$ are target inter-vehicle distances, on the basis of the traveling state information or acceleration request value information of the vehicle $C_n$ and other vehicles. The vehicle control ECU 10 sets the target inter-vehicle distance on the basis of the estimated value of the inter-vehicle distance, which will be described below, considering, for example, the performance or traveling environment of the vehicle $C_n$ that travels in a formation.

The vehicle control ECU 10 includes a vehicle relative position estimation unit (vehicle relative position estimation apparatus) 11 in order to accurately estimate the distance between the vehicles that travel in a formation. The vehicle relative position estimation unit 11 includes a motional state acquiring unit 12, a relative position acquiring unit 13, and an estimation unit 14.

The motional state acquiring unit 12 has a function of acquiring the motional state or acceleration request value information of the vehicle $C_n$ and the motional state or acceleration request value information of other vehicles. The motional state indicates, for example, a vehicle speed or acceleration and is included in the traveling state information. For example, the motional state acquiring unit 12 has a function of acquiring the motional state detected by the wheel speed sensor 23a and the acceleration sensor 24a provided in the vehicle $C_n$ through the communication/sensor system CAN 20. Alternatively, the motional state acquiring unit 12 has a function of receiving the acceleration request value information of the vehicle $C_n$. In addition, for example, the motional state acquiring unit 12 has a function of acquiring the motional state detected by the wheel speed sensor 23a and the acceleration sensor 24a provided in other vehicles through the communication/sensor system CAN 20 using inter-vehicle communication. Alternatively, the motional state acquiring unit 12 has a function of acquiring the acceleration request value information of other vehicles through the communication/sensor system CAN 20 using inter-vehicle communication. In addition, the motional state acquiring unit 12 has a function of outputting the acquired motional state or acceleration request value information of the vehicle $C_n$ and the acquired motional state or acceleration request value information of other vehicles to the estimation unit 14.

The relative position acquiring unit 13 has a function of acquiring the measured relative position between the vehicles traveling in a formation. For example, the relative position acquiring unit 13 has a function of acquiring the inter-vehicle distances $D_{n-1}$ and $D_n$ detected by the front inter-vehicle distance sensor 21a and the rear inter-vehicle distance sensor 22a provided in the vehicle $C_n$. In addition, the relative position acquiring unit 13 has, for example, a function of acquiring the inter-vehicle distances detected by the front inter-vehicle distance sensor 21a and the rear inter-vehicle distance sensor 22a provided in other vehicles. The relative position acquiring unit 13 also has a function of outputting the acquired inter-vehicle distances to the estimation unit 14.

The estimation unit 14 has a function of estimating the distance between the vehicles traveling in a formation, on the basis of the motional state or acceleration request value information of the vehicle $C_n$ and the motional state or acceleration request value information of other vehicles acquired by the motional state acquiring unit 12, and the inter-vehicle distances acquired by the relative position acquiring unit 13. Specifically, the estimation unit 14 has a function of estimating the distance between the vehicles using a Kalman filter.

Figure 3:
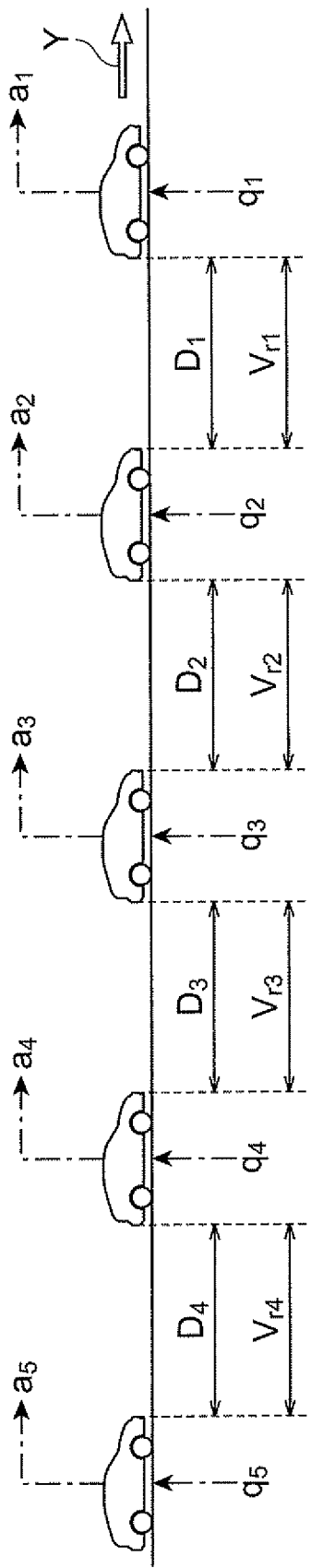
FIG. 3 is a diagram schematically illustrating the traveling state of vehicles in the formation traveling system including the vehicle relative position estimation apparatus according to the first embodiment.

The Kalman filter will be described in detail below. The Kalman filter of the vehicle relative position estimation unit 11 according to this embodiment has a function of combining and integrating a measured value with the motion (system) of the vehicle to calculate a motional state estimated value. The Kalman filter is an algorithm that balances a plurality of measured values with different accuracies with the estimated values obtained by a state equation indicating the motion of the vehicle and estimates the optimal state of the system. Specifically, the Kalman filter is an algorithm that gives an appropriate weight according to the magnitude of an error to estimate the optimal state of the system when there is an error in each of the measured value and the estimated value. For ease of understanding, the motion equation of the system and an observation equation obtained by the measured values, which are used in the Kalman filter, will be described using the vehicles that travel in a formation as shown in FIG. 3 as an example. As shown in FIG. 3, five vehicles $C_1$ to $C_5$ travel in the Y direction. The accelerations $a_1$ to $a_5$ of the vehicles $C_1$ to $C_5$ are acquired by the acceleration sensors 24a and the acceleration sensors ECU 24 provided in the vehicles $C_1$ to $C_5$, or they are obtained from the acceleration request values calculated by the vehicle control ECUs 10 of the vehicles $C_1$ to $C_5$. In addition, it is assumed that the relative velocities between the vehicles $C_1$ to $C_5$ are $Vr_1$ to $Vr_4$, the distances between the vehicles $C_1$ to $C_5$ are $D_1$ to $D_4$, and system noises applied to the vehicles $C_1$ to $C_5$ are $q_1$ to $q_5$. The system noise includes, for example, an acceleration variation due to disturbance, a measurement error of the acceleration sensor 24a, a control error, and an error in the equation of motion. A predetermined value is used as the system noise. In the system, a state equation represented by the following Expression 1 is established:

$$\frac{d}{dt}x = \frac{d}{dt}\begin{bmatrix} D_1 \\ Vr_1 \\ D_2 \\ Vr_2 \\ D_3 \\ Vr_3 \\ D_4 \\ Vr_4 \end{bmatrix}$$ [Expression 1]

$$= \begin{bmatrix} 0 & 1 & 0 & 0 & 0 & 0 & 0 & 0 \\ 0 & 0 & 0 & 0 & 0 & 0 & 0 & 0 \\ 0 & 0 & 0 & 1 & 0 & 0 & 0 & 0 \\ 0 & 0 & 0 & 0 & 0 & 0 & 0 & 0 \\ 0 & 0 & 0 & 0 & 0 & 1 & 0 & 0 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 0 & 0 \end{bmatrix} \begin{bmatrix} D_1 \\ Vr_1 \\ D_2 \\ Vr_2 \\ D_3 \\ Vr_3 \\ D_4 \\ Vr_4 \end{bmatrix} +$$

$$\begin{bmatrix} 0 & 0 & 0 & 0 & 0 \\ 1 & -1 & 0 & 0 & 0 \\ 0 & 0 & 0 & 0 & 0 \\ 0 & 1 & -1 & 0 & 0 \\ 0 & 0 & 0 & 0 & 0 \\ 0 & 0 & 1 & -1 & 0 \\ 0 & 0 & 0 & 0 & 0 \\ 0 & 0 & 0 & 1 & -1 \end{bmatrix} \begin{bmatrix} a_1 \\ a_2 \\ a_3 \\ a_4 \\ a_5 \end{bmatrix} +$$

$$\begin{bmatrix} 0 & 0 & 0 & 0 & 0 \\ 1 & -1 & 0 & 0 & 0 \\ 0 & 0 & 0 & 0 & 0 \\ 0 & 1 & -1 & 0 & 0 \\ 0 & 0 & 0 & 0 & 0 \\ 0 & 0 & 1 & -1 & 0 \\ 0 & 0 & 0 & 0 & 0 \\ 0 & 0 & 0 & 1 & -1 \end{bmatrix} \begin{bmatrix} q_1 \\ q_2 \\ q_3 \\ q_4 \\ q_5 \end{bmatrix}$$

$$= A \cdot x + B \cdot u + H \cdot w$$

In Expression 1, x is a state variable. The matrix A associates the state of the system with the state variable x when there is no noise. The matrix B associates a system input with the state variable x. The matrix H associates system noise with the state variable x. It is possible to logically indicate the motion of the vehicles $C_1$ to $C_5$ on the basis of the accelerations $a_1$ to $a_5$ using Expression 1.

Next, the observation equation will be described. It is possible to calculate the difference between the wheel speeds of adjacent vehicles from the wheel speeds $Vh_1$ to $Vh_5$ detected by the wheel speed sensors 23a of the vehicles $C_1$ to $C_5$. The difference between the wheel speeds is referred to as $Vr_h$. In addition, it is possible to calculate a relative velocity on the basis of the inter-vehicle distances $D_{RF}$ and $D_{FF}$ detected by the front inter-vehicle distance sensor 21a and the rear inter-vehicle distance sensor 22a of each of the vehicles $C_1$ to $C_5$. The relative velocities are referred to as $Vr_{RF}$ and $Vr_{FF}$. It is assumed that the observed noise of the difference between the wheel speeds calculated on the basis of the wheel speed sensors 23a of the vehicles $C_1$ to $C_5$ is $v_a$, the observed noise of the relative velocity calculated on the basis of the front inter-vehicle distance sensor 21a is $v_b$, the observed noise of the relative velocity calculated on the basis of the rear inter-vehicle distance sensor 22a is $v_c$, the observed noise of the inter-vehicle distance calculated on the basis of the front inter-vehicle distance sensor 21a is $v_d$, and the observed noise of the inter-vehicle distance calculated on the basis of the rear inter-vehicle distance sensor 22a is $v_e$. When the sensors of all of the vehicles $C_1$ to $C_5$ are used, an observation equation represented by the following Expression 2 is established.

$$Y = \begin{bmatrix} Vr_s \\ Vr_{FR} \\ Vr_{RR} \\ D_{FR} \\ D_{RR} \end{bmatrix}$$ [Expression 2]

$$= \begin{bmatrix} C_{11} & C_{21} & C_{31} & C_{41} & C_{51} & C_{61} & C_{71} & C_{81} \\ C_{12} & C_{22} & C_{32} & C_{42} & C_{52} & C_{62} & C_{72} & C_{82} \\ C_{13} & C_{23} & C_{33} & C_{43} & C_{53} & C_{63} & C_{73} & C_{83} \\ C_{14} & C_{24} & C_{34} & C_{44} & C_{54} & C_{64} & C_{74} & C_{84} \\ C_{15} & C_{25} & C_{35} & C_{45} & C_{55} & C_{65} & C_{75} & C_{85} \end{bmatrix} \begin{bmatrix} D_1 \\ Vr_1 \\ D_2 \\ Vr_2 \\ D_3 \\ Vr_3 \\ D_4 \\ Vr_4 \end{bmatrix} + \begin{bmatrix} v_a \\ v_b \\ v_c \\ v_d \\ v_e \end{bmatrix}$$

$$= C \cdot x + v$$

In Expression 1, Y is an actually observed value. The matrix C associates the observed value (true value) when there is no noise with the actually observed value. The matrix v indicates the error of each sensor. It is possible to represent the observation result of the motion of the vehicles $C_1$ to $C_5$ based on the values measured by the sensors using Expression 2.

Figure 4:
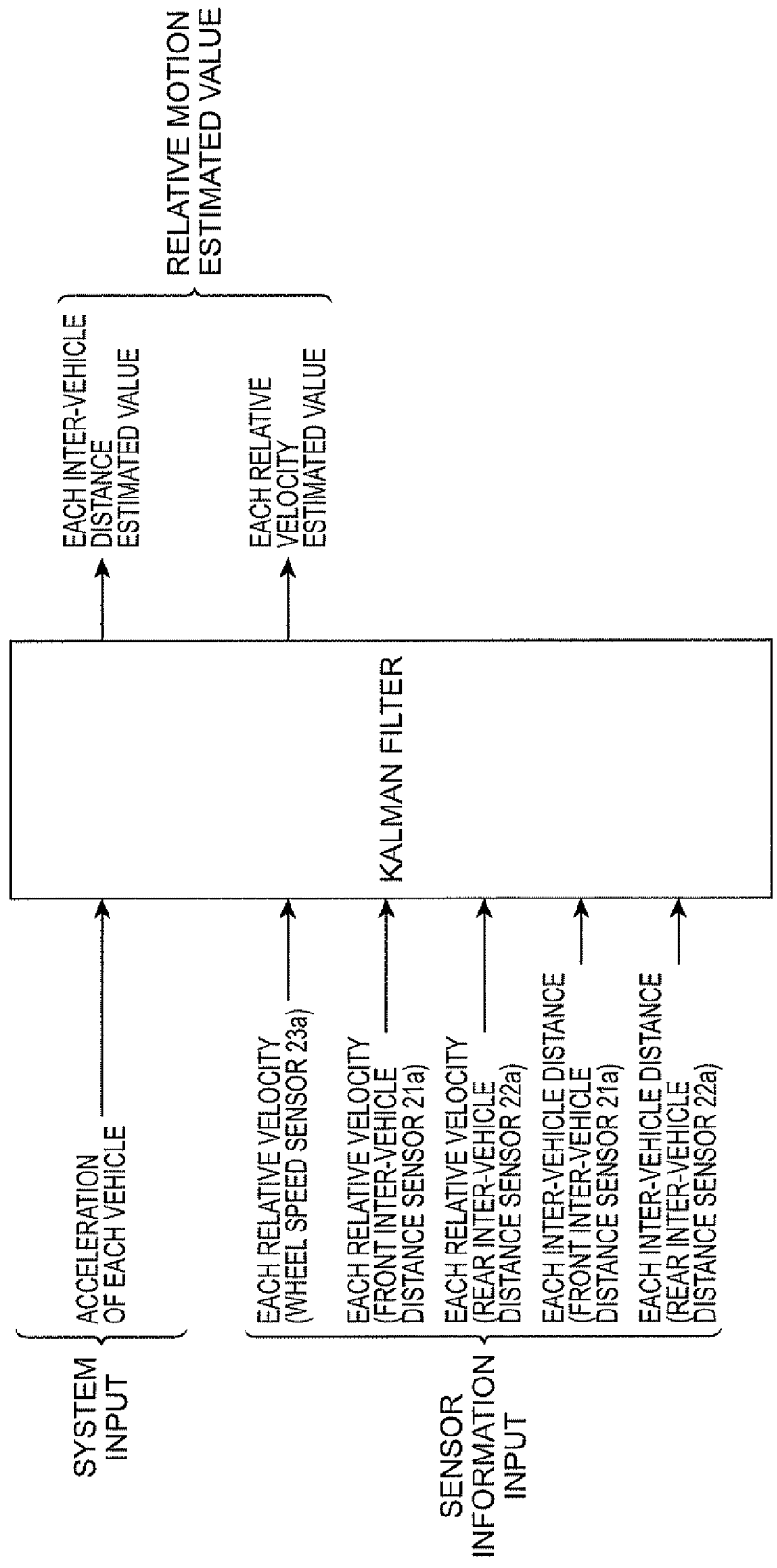
FIG. 4 is a diagram schematically illustrating a Kalman filter of the vehicle relative position estimation apparatus according to the first embodiment.

The state equation and the observation equation are used to calculate whether the Kalman filter gives priority to a logical value or the observed value and output the optimal estimated value. The input and output of the Kalman filter will be described with reference to FIG. 4. As shown in FIG. 4, the Kalman filter receives the acceleration of each vehicle as a system input and calculates the state equation represented by Expression 1. In addition, the Kalman filter acquires, as a sensor information input, each relative velocity and each inter-vehicle distance from the wheel speed sensor 23a, the front inter-vehicle distance sensor 21a, and the rear inter-vehicle distance sensor 22a of each vehicle and calculates the observation equation. Then, the Kalman filter outputs the estimated value of each inter-vehicle distance and the estimated value of each relative velocity as relative motion estimated values.

Figure 5:
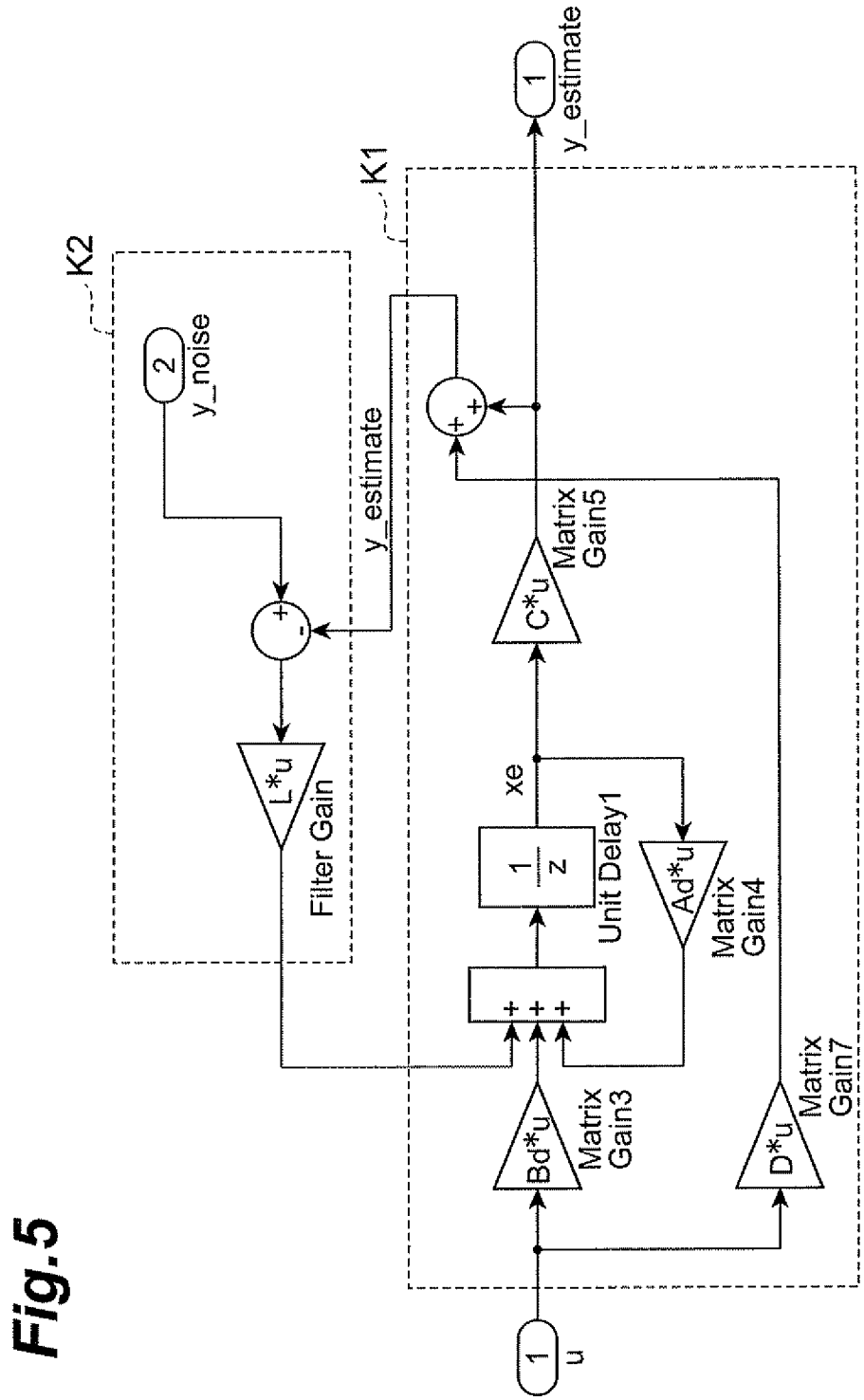
FIG. 5 is a block diagram illustrating the function of the Kalman filter of the vehicle relative position estimation apparatus according to the first embodiment.

FIG. 5 is an example of a block diagram of the Kalman filter. A circuit K1 has a function of receiving the acceleration of each vehicle, calculating the state equation, and predicting the motion of the vehicle (vehicle group). A circuit K2 has a function of feeding back the actual sensor value. The feedback is weighted according to the accuracy of a sensor value. That is, for example, an observed value with a large amount of noise is fed back at a low gain such that the observed value is not trusted. When the state equation has a large error, the observed value is fed back at a high gain such that it is trusted. The gain is a Kalman filter gain of Expression 3, which will be described below.

Figure 6:
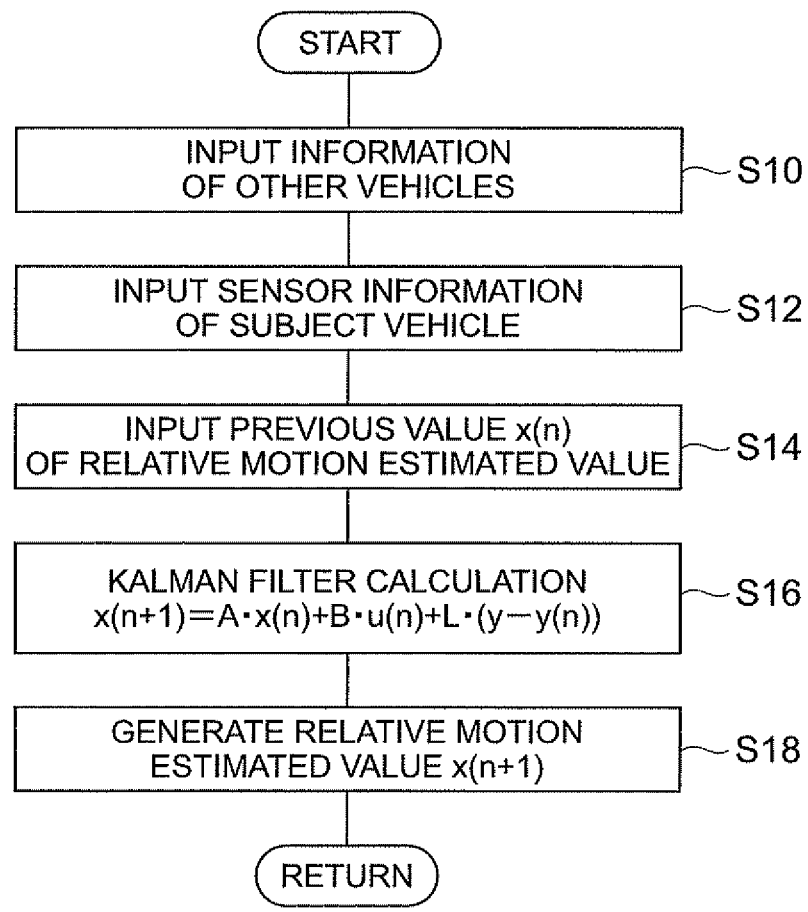
FIG. 6 is a flowchart illustrating the operation of the vehicle relative position estimation apparatus according to the first embodiment.

Next, the operation of the vehicle relative position estimation unit 11 will be described. FIG. 6 is a flowchart illustrating the operation of the vehicle relative position estimation unit 11 according to this embodiment. For example, a control process shown in FIG. 6 is repeatedly performed at a predetermined interval from the time when the ignition is turned on.

As shown in FIG. 6, the vehicle relative position estimation unit 11 starts the control process from a step of inputting the information of other vehicles (S10). Step S10 is performed by the motional state acquiring unit 12 and the relative position acquiring unit 13 to input the information of other vehicles. The motional state acquiring unit 12 acquires the traveling state information or acceleration request value information of other vehicles, which is input to the wireless antenna 25a and the wireless control ECU 25 by, for example, inter-vehicle communication, through the communication/sensor system CAN 20. The relative position acquiring unit 13 acquires the relative position information acquired by other vehicles, which is input to the wireless antenna 25a and the wireless control ECU 25 by, for example, inter-vehicle communication, through the communication/sensor system CAN 20. When Step S10 ends, the process proceeds to a step of acquiring information from the subject vehicle (S12).

Step S12 is performed by the motional state acquiring unit 12 and the relative position acquiring unit 13 to acquire information from the sensors provided in the subject vehicle (vehicle $C_n$). The motional state acquiring unit 12 acquires the wheel speed information and the acceleration information output from the wheel speed sensor ECU 23 and the acceleration sensor ECU 24 through the communication/sensor system CAN 20. The relative position acquiring unit 13 acquires the inter-vehicle distance information output from the front sensor ECU 21 and the rear sensor ECU 22 through the communication/sensor system CAN 20. When Step S12 ends, the process proceeds to a step of inputting a previous value (S14).

Step S14 is performed by the estimation unit 14 to input the previous value $x(n)$ of the relative motion estimated value. The estimation unit 14 refers to and inputs the previous value $x(n)$ of the relative motion estimated value stored in, for example, a memory. At the beginning, a predetermined initial value is input. When Step S14 ends, the process proceeds to a Kalman filter calculation step (S16).

Steps S16 and S18 are performed by the estimation unit 14 to calculate a relative motion estimated value $x(n+1)$ using the Kalman filter. For example, the estimation unit 14 calculates the relative motion estimated value using the following Expression 3.

$$x(n+1)=A \cdot x(n)+B \cdot u(n)+L \cdot (y-y(n)) \qquad \text{[Expression 3]}$$

In Expression 3, A and B are matrices of the state equation, $u(n)$ is acceleration, L is a Kalman filter gain, y is the true value of an observed value, and $y(n)$ is the observed value. The Kalman filter gain is calculated on the basis of Expressions 1 and 2. When Steps S16 and S18 end, the control process shown in FIG. 6 ends.

In this way, the control process shown in FIG. 6 ends. The relative motion estimated value $x(n+1)$ generated in Step S18 is the previous value input in Step S14 in the next step. The control process shown in FIG. 6 makes it possible to accurately calculate the relative velocity and the relative distance, considering the information obtained by the sensors of other vehicles or the motional state of other vehicles, which is acquired by communication, in addition to the values obtained by the sensors provided in the subject vehicle. Therefore, the vehicle control ECU 10 can accurately control the vehicle using the relative velocity and the inter-vehicle distance. Therefore, it is possible to accurately control the vehicles that travel in a formation.

As described above, according to the vehicle relative position estimating apparatus 11 of the first embodiment, the motional state acquiring unit 12 acquires vehicle control information (acceleration request value) for controlling the motional state of the vehicle $C_n$ or the acceleration $a_n$ of the vehicle $C_n$ detected by the acceleration sensor 24a of the vehicle $C_n$, and vehicle control information (acceleration request value) for controlling the motional state of other vehicles or the accelerations of other vehicles detected by the acceleration sensors 24a of other vehicles. The relative position acquiring unit 13 acquires the relative positions $D_{RF}$ and $D_{FF}$ detected by the front inter-vehicle distance sensor 21a and the rear inter-vehicle distance sensor 22a provided in the vehicle $C_n$ or other vehicles. The estimation unit 14 receives the acceleration request value or acceleration $a_n$ of the vehicle $C_n$ and the acceleration request values or accelerations of other vehicles and estimates a relative position and a relative velocity with the Kalman filter, using the relative positions $D_{RF}$ and $D_{FF}$ as the amount of observation. As such, a single apparatus can fuse the relative positions $D_{RF}$ and $D_{FF}$ with, for example, a large measurement error and noise, which are obtained from the front inter-vehicle distance sensor 21a and the rear inter-vehicle distance sensor 22a with different accuracies, with the motional states of the vehicle $C_n$, and other vehicles using the Kalman filter. Therefore, it is possible to estimate a relative position and a relative velocity with, for example, a small measurement error and noise. That is, it is possible to accurately estimate an inter-vehicle distance (relative velocity) with small noise by fusing the information of other vehicles obtained by inter-vehicle communication with the sensors of the subject vehicle using the Kalman filter. Therefore, it is possible to accurately estimate the relative position between the vehicle $C_n$ and another vehicle $C_{n-1}$. As such, since noise can be removed to improve the stability of disturbance resistance, it is possible to drive the vehicles in a formation using high-gain feedback. Therefore, it is possible to control the distance between the vehicles traveling in a formation to be reduced. In addition, since the relative position can be accurately acquired, it is not necessary to process the relative positions $D_{RF}$ and $D_{FF}$ obtained from the front inter-vehicle distance sensor 21a and the rear inter-vehicle distance sensor 22a using, for example, a moderating process, and it is possible to remove the dead zone of vehicle control. Therefore, it is possible to finely quantize the quantity of state used in feedback control with the Kalman filter. In addition, it is possible to estimate the relative position, regardless of the frequency of update of the state equation and the observation equation. Therefore, for example, it is possible to calculate the estimated value at an interval shorter than the update cycle of the front inter-vehicle distance sensor 21a and the rear inter-vehicle distance sensor 22a. As a result, it is possible to improve the response of traveling control and control the distance between the vehicles traveling in a formation to be short. In addition, since information used in the estimation process of the vehicle relative position estimation apparatus 11 relates to acceleration, a speed, a relative velocity, and an inter-vehicle distance, it is possible to perform the estimation process with a small amount of communication. Since the estimation process is based on information generally acquired from the vehicle, the estimation process does not depend on other control processes and expendability is high. In addition, since simple addition and multiplication are used for the estimation process, it is possible to reduce a processing load. It is possible to independently and distributedly estimate each vehicle and control the traveling of the vehicles in a formation. It is also possible to accurately estimate the relative position between other vehicles in addition to the relative position between the vehicle $C_n$ and another vehicle $C_{n-1}$.

Second Embodiment

A vehicle relative position estimation apparatus (vehicle relative position estimation unit) according to a second embodiment has substantially the same structure as the vehicle relative position estimation unit 11 according to the first embodiment, but differs from the vehicle relative position estimation unit 11 according to the first embodiment in the relative position information acquired by the relative position acquiring unit 13. In the second embodiment, a description of the same components as those in the first embodiment will be omitted, and the difference between the first and second embodiments will mainly be described.

A vehicle $C_n$ according to the second embodiment has substantially the same structure as the vehicle $C_n$ according to the first embodiment and differs from the vehicle $C_n$ according to the first embodiment in that it includes a navigation system (not shown) instead of or in addition to the front inter-vehicle distance sensor 21a and the rear inter-vehicle distance sensor 22a. The navigation system includes a GPS (Global Positioning System) receiver and has a function of receiving GPS information (X coordinate: $X_n$ and Y coordinate: $Y_n$), which is the position information of the subject vehicle (vehicle $C_n$). The GPS is a measurement system using a satellite and is appropriately used to check the current position of the subject vehicle. In addition, the navigation system is connected to a vehicle control ECU 10 through a communication/sensor system CAN 20 and has a function of outputting the received position information to the vehicle control ECU 10.

A relative position acquiring unit 13 included in the vehicle relative position estimation unit according to the second embodiment has a function of acquiring the position information of the vehicle $C_n$ output from the navigation system. In addition, the relative position acquiring unit 13 has a function of acquiring the position information of other vehicles output from the navigation systems of other vehicles using inter-vehicle communication or a function of acquiring the position information of other vehicles output from the navigation system of the vehicle $C_n$ when the navigation system of the vehicle $C_n$ acquires the position information of other vehicles. The relative position acquiring unit 13 also has a function of calculating the relative position between the vehicles on the basis of the acquired position information. The other functions are the same as those in the first embodiment.

Figure 7:
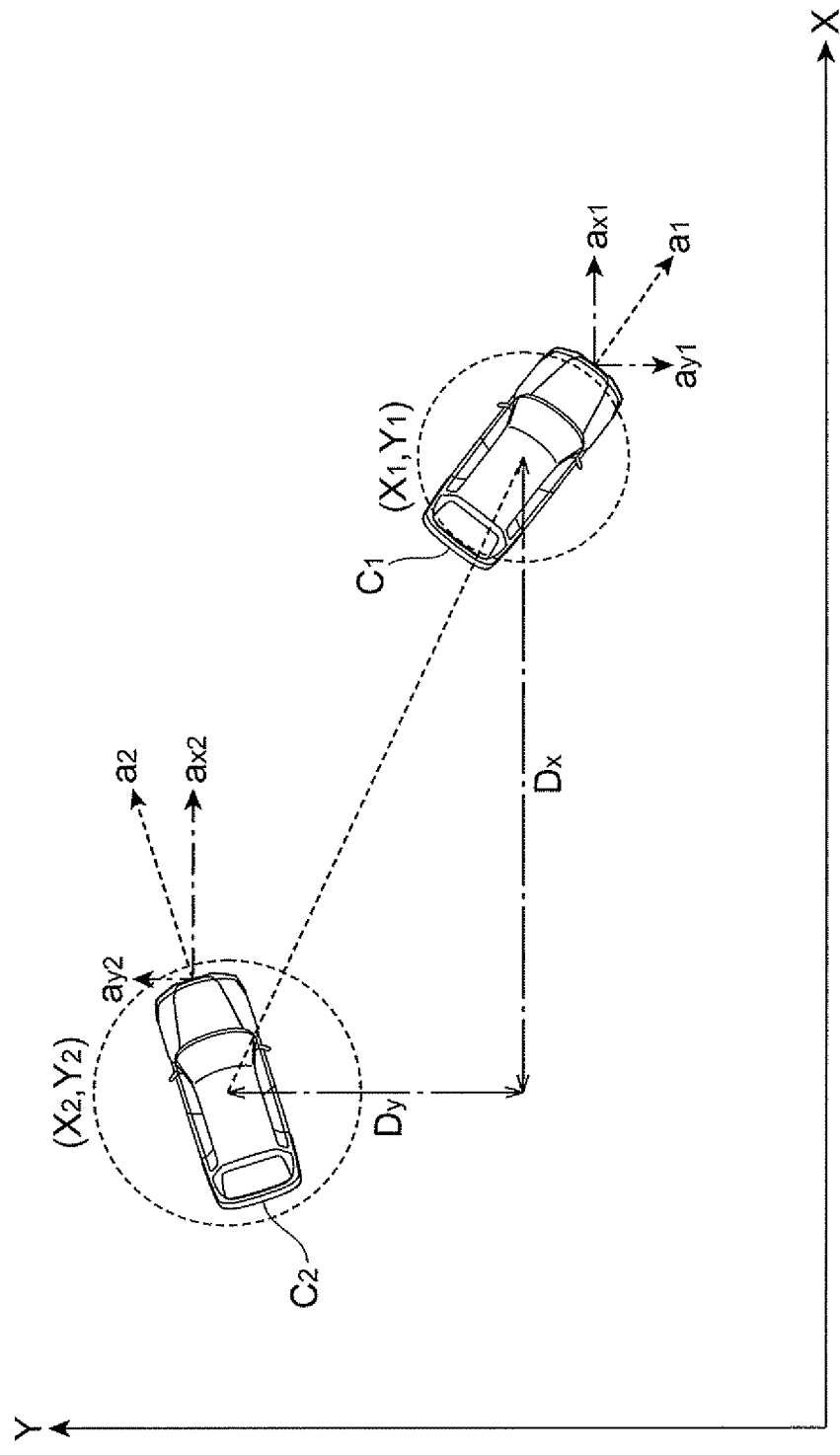
FIG. 7 is a diagram schematically illustrating a formation traveling system including a vehicle relative position estimation apparatus according to a second embodiment.

FIG. 7 is a diagram schematically illustrating the position information $(X_n, Y_n)$ acquired by the relative position acquiring unit 13 in the vehicle relative position estimation unit according to the second embodiment. FIG. 7 shows an example in which two vehicles, that is, a preceding vehicle $C_1$ and a following vehicle $C_2$ travel in a formation. For example, when the subject vehicle is the vehicle $C_2$, the relative position acquiring unit 13 of the vehicle $C_2$ has a function of acquiring the position information $(X_1, Y_1)$ of the vehicle $C_1$ and the position information $(X_2, Y_2)$ of the vehicle $C_2$ and calculating a relative distance $D_x$ in the X direction and a relative distance $D_y$ in the Y direction. A circle (error circle) represented by a dotted line in FIG. 7 is an error range indicating, for example, the observed noise of GPS information obtained by the navigation system. As shown in FIG. 7, the acceleration $a_n$ of the vehicle $C_n$ is represented by X-direction component $a_{xn}$ and a Y-direction component $a_{yn}$.

Similar to Expression 1 and Expression 2 according to the first embodiment, the estimation unit 14 receives the acceleration of each vehicle as a system input to calculate a state equation, receives the relative distance $D_x$ in the X direction and the relative distance $D_y$ in the Y direction as a sensor input to calculate an observation equation, uses the Kalman filter to calculate a relative motion estimated value, and outputs the estimated value of each inter-vehicle distance and the estimated value of each relative velocity. In the following description, for ease of understanding, the state equation of the two vehicles shown in FIG. 7 is represented by Expression 4 and the observation equation thereof is represented by Expression 5.

$$\frac{d}{dt}x = \frac{d}{dt}\begin{bmatrix} D_x \\ Vr_x \\ D_y \\ Vr_y \end{bmatrix} \qquad \text{[Expression 4]}$$

$$= \begin{bmatrix} 0 & 1 & 0 & 0 \\ 0 & 0 & 0 & 0 \\ 0 & 0 & 0 & 1 \\ 0 & 0 & 0 & 0 \end{bmatrix}\begin{bmatrix} D_x \\ Vr_x \\ D_y \\ Vr_y \end{bmatrix} + \begin{bmatrix} 0 & 0 & 0 & 0 \\ 1 & 0 & -1 & 0 \\ 0 & 0 & 0 & 0 \\ 0 & 1 & 0 & -1 \end{bmatrix}\begin{bmatrix} a_{1x} \\ a_{1y} \\ a_{2x} \\ a_{1y} \end{bmatrix} + \begin{bmatrix} 0 & 0 & 0 & 0 \\ 1 & 0 & -1 & 0 \\ 0 & 0 & 0 & 0 \\ 0 & 1 & 0 & -1 \end{bmatrix}\begin{bmatrix} q_{1x} \\ q_{1y} \\ q_{2x} \\ q_{1y} \end{bmatrix}$$

$$= A \cdot x + B \cdot u + H \cdot w$$

$$Y = \frac{d}{dt}\begin{bmatrix} X_1 - X_2 \\ Y_1 - Y_2 \end{bmatrix} \qquad \text{[Expression 5]}$$

$$= \begin{bmatrix} 1 & 0 & 0 & 0 \\ 0 & 0 & 1 & 0 \end{bmatrix}\begin{bmatrix} D_x \\ Vr_x \\ D_y \\ Vr_y \end{bmatrix} + \begin{bmatrix} v_x \\ v_y \end{bmatrix}$$

$$= A \cdot x + B \cdot u + H \cdot w$$

Each matrix is the same as that in the first embodiment. In Expression 5, $v_x$ and $v_y$ are the observed noise of a difference in GPS information in the X and Y directions. The estimation unit 14 performs the control process shown in FIG. 6 to estimate the inter-vehicle distance and the relative position on the basis of Expressions 4 and 5. The operation of the vehicle relative position estimation apparatus is the same as the control process shown in FIG. 6 according to the first embodiment and a description thereof will be omitted.

As described above, according to the vehicle relative position estimation apparatus according to the second embodiment, it is possible to obtain the same effect as that of the vehicle relative position estimation apparatus 11 according to the first embodiment and combine the relative position obtained from the GPS information including, for example, a measurement error and noise with the accelerations of the subject vehicle $C_n$ and other vehicles using the Kalman filter. Therefore, it is possible to estimate a relative position (relative velocity) with, for example, a small measurement error and noise. As a result, even when the GPS information has a large error and no sensor is provided in the subject vehicle, it is possible to accurately acquire the relative position and the relative velocity on the basis of the error circle and the acceleration of each vehicle in each direction.

Third Embodiment

A vehicle relative position estimation apparatus (vehicle relative position estimation unit) according to a third embodiment has substantially the same structure as the vehicle relative position estimation unit 11 according to the first embodiment, but differs from the vehicle relative position estimation unit 11 according to the first embodiment in some of the functions of the estimation unit 14. In the third embodiment, a description of the same components as those in the first embodiment will be omitted, and the difference between the first and third embodiments will mainly be described.

A vehicle $C_n$ according to the third embodiment has substantially the same structure as the vehicle $C_n$ according to the first embodiment. The estimation unit 14 included in the vehicle relative position estimation unit according to the third embodiment has substantially the same structure as the estimation unit 14 in the vehicle relative position estimation unit 11 according to the first embodiment, but differs from the estimation unit 14 according to the first embodiment in that it has a function of changing the degree of fusion between the observed value and the motional state obtained by the sensors according to the capture states of the front inter-vehicle distance sensor 21a and the rear inter-vehicle distance sensor 22a. Specifically, the estimation unit 14 has a function of changing and controlling a Kalman filter gain according to the capture states of the front inter-vehicle distance sensor 21a and the rear inter-vehicle distance sensor 22a.

In order to describe in detail the function of the estimation unit 14 provided in the vehicle relative position estimation unit according to the third embodiment, an example in which two vehicles $C_1$ and $C_2$ travel in a formation will be described. The vehicles $C_1$ and $C_2$ are the same as the vehicle $C_n$ according to the first embodiment, and the accelerations $a_1$ and $a_2$ of the vehicles $C_1$ and $C_2$, the distance $D_1$ between the vehicles $C_1$ and $C_2$, the relative velocity $Vr_1$ between the vehicles $C_1$ and $C_2$, and the system noises $q_1$ and $q_2$ of the vehicles $C_1$ and $C_2$ are denoted by the same reference numerals as those in the first embodiment (see the vehicles $C_1$ and $C_2$ in FIGS. 2 and 3).

Similar to Expressions 1 and 2 according to the first embodiment, the state equation of the vehicle vehicles $C_1$ and $C_2$ can be represented by the following Expression 6 and the observation equation obtained by the sensor can be represented by the following Expression 7.

$$\frac{d}{dt}x = \frac{d}{dt}\begin{bmatrix} D_1 \\ Vr_1 \end{bmatrix} \quad \text{[Expression 6]}$$
$$= \begin{bmatrix} 0 & 1 \\ 0 & 0 \end{bmatrix}\begin{bmatrix} D_1 \\ Vr_1 \end{bmatrix} + \begin{bmatrix} 0 & 0 \\ 1 & -1 \end{bmatrix}\begin{bmatrix} a_1 \\ a_2 \end{bmatrix} +$$
$$\begin{bmatrix} 1 & 0 \\ 0 & 1 \end{bmatrix}\begin{bmatrix} q_1 \\ q_2 \end{bmatrix}$$
$$= A \cdot x + B \cdot u + H \cdot w$$

$$Y = \frac{d}{dt}\begin{bmatrix} Vr_s \\ Vr_{FR} \\ Vr_{RR} \\ D_{FR} \\ D_{RR} \end{bmatrix} \quad \text{[Expression 7]}$$
$$= C\begin{bmatrix} D_1 \\ Vr_1 \end{bmatrix} + \begin{bmatrix} v_a \\ v_b \\ v_c \\ v_d \\ v_e \end{bmatrix}$$
$$= C \cdot x + v$$

The estimation unit 14 has a function of changing the matrix C of Expression 7 according to the capture states of the front inter-vehicle distance sensor 21a of the vehicle $C_2$ and the rear inter-vehicle distance sensor 22a of the vehicle $C_1$. Since the front inter-vehicle distance sensor 21a of the vehicle $C_2$ and the rear inter-vehicle distance sensor 22a of the vehicle $C_1$ detect the relative position using electromagnetic waves, such as millimeter waves, it is difficult for the sensors to stably detect information, as compared to the wheel speed sensor 23a or the acceleration sensor 24a. In some cases, the sensors cannot detect the relative position due to, for example, noise (lost state). The estimation unit 14 has a function of selectively changing the matrix C that is prepared in advance, according to the capture states of the front inter-vehicle distance sensor 21a of the vehicle $C_2$ and the capture state of the rear inter-vehicle distance sensor 22a of the vehicle $C_1$, that is, according to whether the front inter-vehicle distance sensor 21a of the vehicle $C_2$ is in the lost state and whether the rear inter-vehicle distance sensor 22a of the vehicle $C_1$ is in the lost state.

A front sensor ECU 21 and a rear sensor ECU 22 have a function of determining whether the front inter-vehicle distance sensor 21a of the vehicle $C_2$ and the rear inter-vehicle distance sensor 22a of the vehicle $C_1$ are in the lost state. For example, when a variation in the intensity of the received millimeter wave is greater than a predetermined value, the front sensor ECU 21 and the rear sensor ECU 22 determine that the sensors are in the lost state. In addition, the front sensor ECU 21 and the rear sensor ECU 22 have a function of outputting the determination result to the vehicle control ECU 10.

The estimation unit 14 receives the determination result output from the front sensor ECU 21 and the rear sensor ECU 22 and uses the matrix C represented by the following Expression 8 when both the front inter-vehicle distance sensor 21a of the vehicle $C_2$ and the rear inter-vehicle distance sensor 22a of the vehicle $C_1$ are in a detecting state (XTRGT_Status: 1).

$$C = \begin{bmatrix} 0 & 1 \\ 0 & 1 \\ 0 & 1 \\ 1 & 0 \\ 1 & 0 \end{bmatrix} \quad \text{[Expression 8]}$$

For example, when the front inter-vehicle distance sensor 21a of the vehicle $C_2$ is in the detecting state and the rear inter-vehicle distance sensor 22a of the vehicle $C_1$ is in the lost state (XTRGT_Status: 2), the estimation unit 14 uses the matrix C represented by the following Expression 9.

$$C = \begin{bmatrix} 0 & 1 \\ 0 & 1 \\ 0 & 0 \\ 1 & 0 \\ 0 & 0 \end{bmatrix} \quad \text{[Expression 9]}$$

For example, when the front inter-vehicle distance sensor 21a of the vehicle $C_2$ is in the lost state and the rear inter-vehicle distance sensor 22a of the vehicle $C_1$ is in the detecting state (XTRGT_Status: 3), the estimation unit 14 uses the matrix C represented by the following Expression 10.

$$C = \begin{bmatrix} 0 & 1 \\ 0 & 0 \\ 0 & 1 \\ 0 & 0 \\ 1 & 0 \end{bmatrix} \quad \text{[Expression 10]}$$

As such, the estimation unit 14 determines the observation equation using the matrix C changed depending on the capture state of the front inter-vehicle distance sensor 21a of the vehicle $C_2$ and the capture state of the rear inter-vehicle distance sensor 22a of the vehicle $C_1$. Then, the estimation unit 14 calculates a Kalman filter gain $L_n$ on the basis of the determined observation equation and the state equation represented by Expression 6. It is assumed that the Kalman filter gain when the matrix C represented by Expression 8 is used, that is, in XTRGT_Status1 is $L_1$, the Kalman filter gain when the matrix C represented by Expression 9 is used, that is, in XTRGT_Status2 is $L_2$, and the Kalman filter gain when the matrix C represented by Expression 10 is used, that is, in XTRGT_Status3 is $L_3$.

The estimation unit 14 has a function of receiving the determination results output from the front sensor ECU 21 and the rear sensor ECU 22 and setting the Kalman filter gain to $L_0=0$ when both the front inter-vehicle distance sensor 21a of the vehicle $C_2$ and the rear inter-vehicle distance sensor 22a of the vehicle $C_1$ are in the lost state (XTRGT_Status: 0). That is, the estimation unit 14 has a function of calculating the relative motion estimated value without using any sensor value in XTRGT_Status0. In this case, the estimation unit 14 has a function of integrating the accelerations $a_1$ and $a_2$ of the two vehicles $C_1$ and $C_2$ to calculate the relative velocity and integrating the integrated accelerations $a_1$ and $a_2$ to calculate the inter-vehicle distance.

Figure 8:
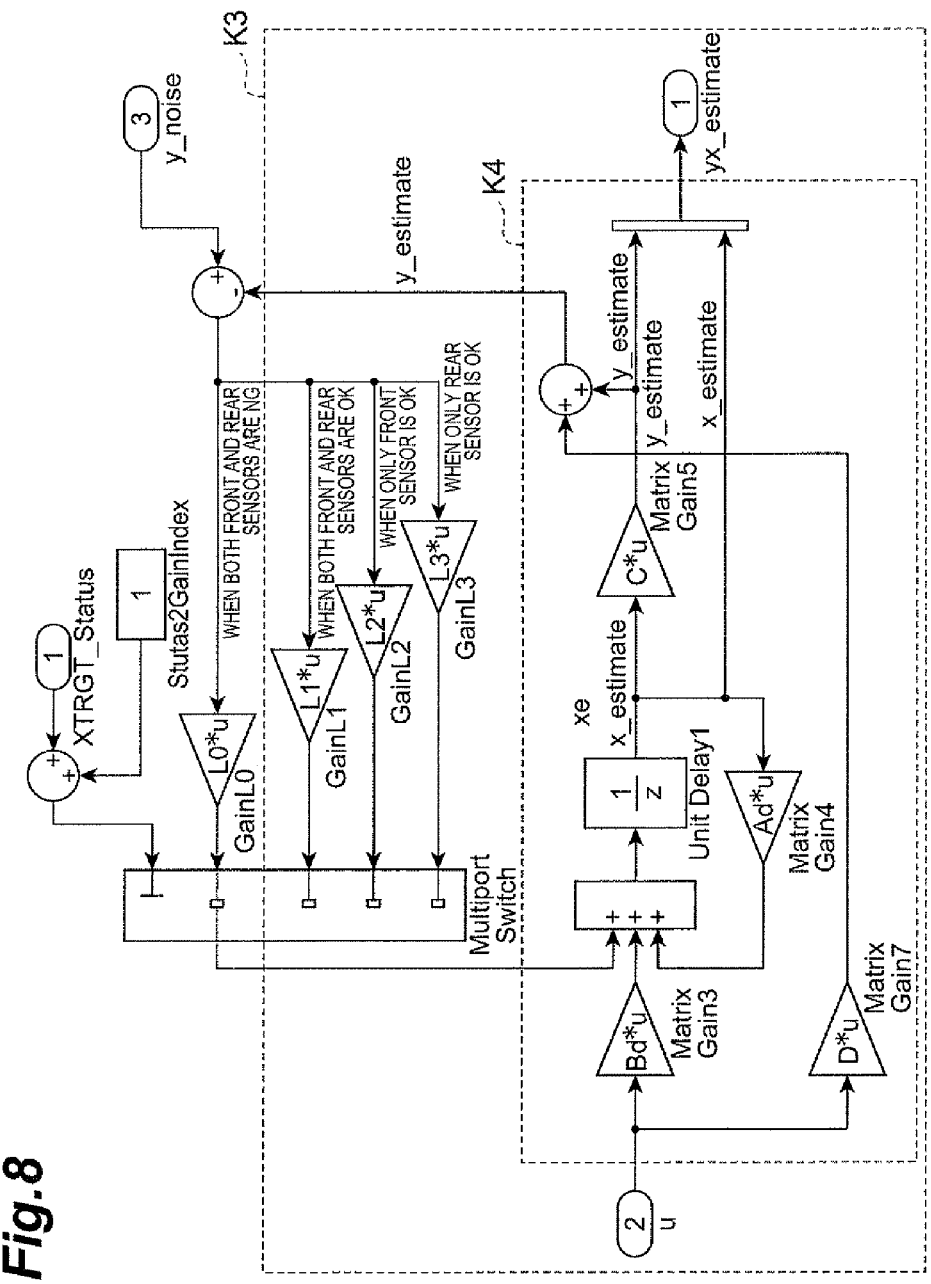
FIG. 8 is a block diagram illustrating the function of a Kalman filter of a vehicle relative position estimation apparatus according to a third embodiment.

FIG. 8 shows an example of a block diagram of the Kalman filter according to this embodiment. A circuit K3 has a function of predicting the motion of the vehicle (vehicle group) while feeding back the current sensor value. By the feedback, the gain (Kalman gain) is changed depending on the capture state of the sensors and is weighted. For example, in XTRGT_Status1, the observed values obtained by the sensors are weighted with the Kalman filter gain $L_1$. In XTRGT_Status2, the observed values obtained by the sensors are weighted with the Kalman filter gain $L_2$. In XTRGT_Status3, the observed values obtained by the sensors are weighted with the Kalman filter gain $L_3$.

In XTRGT_Status0, the observed values obtained by the sensors are weighted with the Kalman filter gain $L_0$. However, since $L_0$ is zero, only a circuit K4 is operated. The circuit K4 has a function of receiving the accelerations $a_1$ and $a_2$ of the two vehicles $C_1$ and $C_2$ as an input, calculating the state equation, and predicting the motion of the vehicle (vehicle group). That is, in XTRGT_Status0, the estimation unit 14 has a function of calculating the relative motion estimated value without using all of the sensor values.

Figure 9:
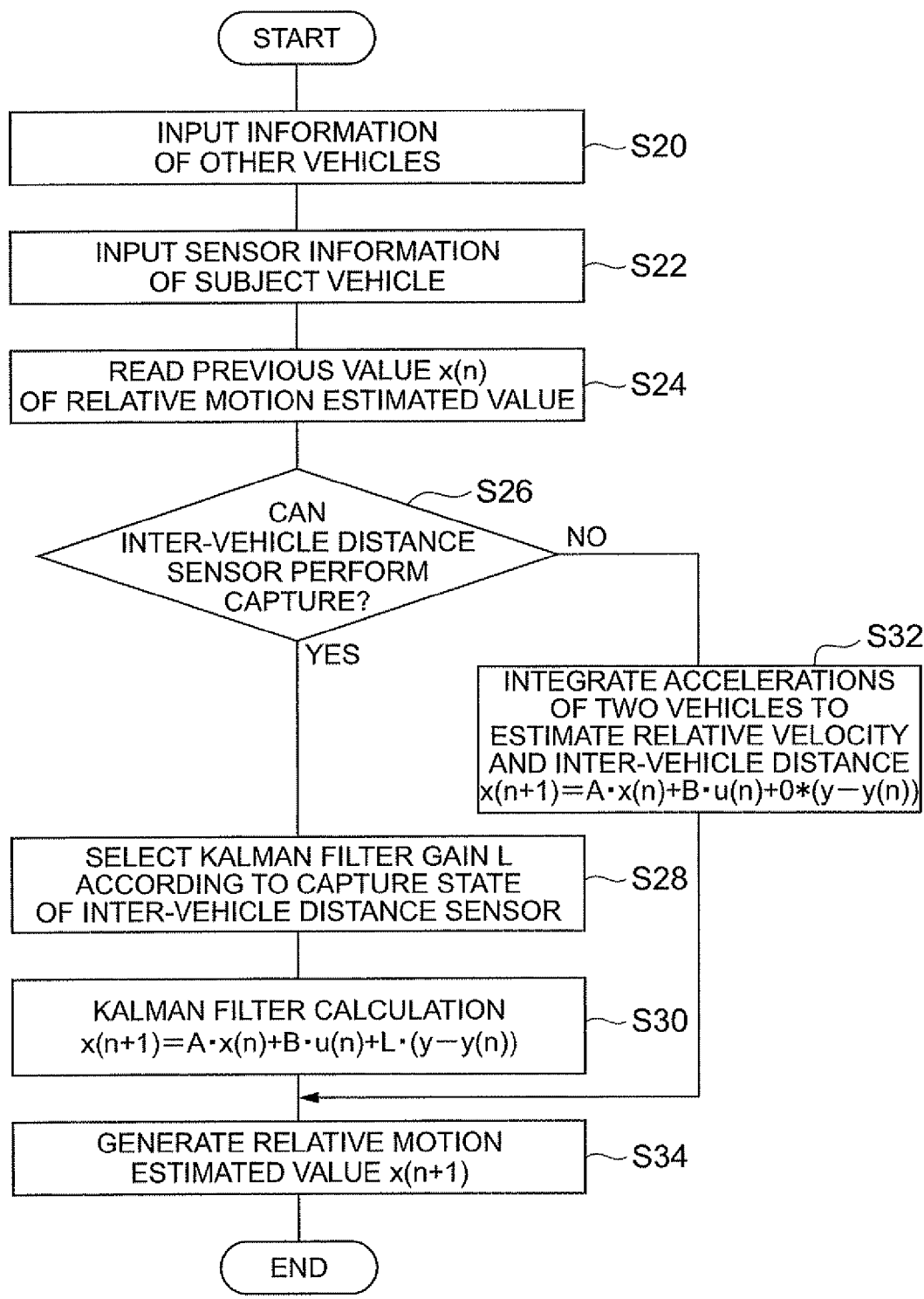
FIG. 9 is a flowchart illustrating the operation of the vehicle relative position estimation apparatus according to the third embodiment.

Next, the operation of the vehicle relative position estimation unit according to the third embodiment will be described. FIG. 9 is a flowchart illustrating the operation of the vehicle relative position estimation unit according to this embodiment. For example, a control process shown in FIG. 9 is repeatedly performed at a predetermined interval from the time when ignition is turned on. For ease of understanding, a case in which two vehicles $C_1$ and $C_2$ (the subject vehicle) travel in a formation will be described below.

As shown in FIG. 9, the vehicle relative position estimation unit 11 starts the control process from a step of inputting the information of other vehicles (S20). The step is the same as Step S10 in FIG. 6. When Step S20 ends, the process proceeds to a step of acquiring the information of the subject vehicle (S22).

Step S22 is performed by the motional state acquiring unit 12 and the relative position acquiring unit 13 to acquire information from the sensors provided in the subject vehicle (vehicle $C_2$). Step S22 is the same as Step S12 in FIG. 6. When Step S22 ends, the process proceeds to a step of inputting a previous value (S24).

Step S24 is performed by the estimation unit 14 to input the previous value x(n) of a relative motion estimated value. Step S24 is the same as Step S14 in FIG. 6. When Step S24 ends, the process proceeds to a step of determining the capture state (S26).

Step S26 is performed by the estimation unit 14 to determine the capture state of the front inter-vehicle distance sensor 21a of the vehicle $C_2$ and the capture state of the rear inter-vehicle distance sensor 22a of the vehicle $C_1$. The estimation unit 14 receives the determination result of the capture state output from each of the front sensor ECU 21 and the rear sensor ECU 22 and determines which of XTRGT_Status0 to XTRGT_Status3 the current state corresponds to. In Step S26, when the current state does not correspond to XTRGT_Status0, the process proceeds to a gain selection step (S28).

Step S28 is performed by the estimation unit 14 to select the Kalman filter gain according to XTRGT_Status. In XTRGT_Status1, the estimation unit 14 selects the Kalman filter gain $L_1$. In XTRGT_Status2, the estimation unit 14 selects the Kalman filter gain $L_2$. In XTRGT_Status3, the estimation unit 14 selects the Kalman filter gain $L_3$. When Step S28 ends, the process proceeds to a Kalman filter calculation step (S30).

Steps S30 and S34 are performed by the estimation unit 14 to calculate a relative motion estimated value x(n+1) using the Kalman filter. For example, the estimation unit 14 substitutes the Kalman filter gain L of Expression 3 according to the first embodiment with the Kalman filter gains $L_1$ to $L_3$ selected in Step S28 and calculates the relative motion estimated value x(n+1). When Steps S30 and S34 end, the control process shown in FIG. 9 ends.

In Step S26, when the current state corresponds to XTRGT_Status0, the process proceeds to a step of estimating the relative motion (S32). Steps S32 and S34 are performed by the estimation unit 14 to substitute the Kalman filter gain L of Expression 3 according to the first embodiment with 0 and calculate the relative motion estimated value x(n+1). That is, the estimation unit 14 integrates the accelerations $a_1$ and $a_2$ of the two vehicles $C_1$ and $C_2$ to calculate a relative velocity and integrates the relative velocity to calculate an inter-vehicle distance. When Steps S32 and S34 end, the control process shown in FIG. 9 ends.

In this way, the control process shown in FIG. 9 ends. The relative motion estimated value x(n+1) generated in Step S34 becomes the previous value input in Step S24 in the next process. When the control process shown in FIG. 9 is performed, it is possible to change the degree of fusion of the Kalman filter according to the capture state of the front inter-vehicle distance sensor 21a of the vehicle $C_2$ and the capture state of the rear inter-vehicle distance sensor 22a of the vehicle $C_1$. Therefore, even when the front inter-vehicle distance sensor 21a or the rear inter-vehicle distance sensor 22a cannot detect signals, it is possible to accurately estimate the inter-vehicle distance and the relative velocity.

However, for example, when Expression 1 and Expression 2 according to the first embodiment are used, it is possible to estimate the distances between all of the vehicles $C_1$ to $C_5$, but both the front inter-vehicle distance sensor 21a and the rear inter-vehicle distance sensor 22a that measure the distances between the vehicles $C_1$ to $C_5$ need to be in the detecting state. Therefore, when Expression 1 and Expression 2 according to the first embodiment are used, there is a concern that the availability of the vehicle relative position estimation apparatus will be reduced.

In contrast, according to the vehicle relative position estimation apparatus of the third embodiment, it is possible to obtain the same effect as that of the vehicle relative position estimation apparatus 11 according to the first embodiment and change the degree of fusion by the Kalman filter according to the capture state of an in-vehicle apparatus. Therefore, since it is possible to reflect the capture state of an in-vehicle apparatus detecting the relative position to the estimated value of the relative position, both the front inter-vehicle distance sensor 21a and the rear inter-vehicle distance sensor 22a do not need to be in the detecting state. As such, for example, even when one of a plurality of in-vehicle apparatuses cannot detect the relative position and the relative velocity due to an unexpected situation, it is possible to calculate the estimated value. Therefore, it is possible to improve the availability of the vehicle relative position estimation apparatus.

According to the vehicle relative position estimation apparatus of the third embodiment, when both the front inter-vehicle distance sensor 21a and the rear inter-vehicle distance sensor 22a detecting the relative position cannot detect the relative position for a predetermined period of time, the estimation unit 14 can estimate the relative position and the relative velocity on the basis of the acceleration $a_n$ (or acceleration request value information). Therefore, it is possible to improve the availability of the vehicle relative position estimation apparatus.

Fourth Embodiment

A vehicle relative position estimation apparatus (vehicle relative position estimation unit) according to a fourth embodiment has substantially the same structure as the vehicle relative position estimation unit according to the third embodiment, but differs from the vehicle relative position estimation unit according to the third embodiment in some of the functions of the vehicle control ECU (control unit) 10. In the fourth embodiment, a description of the same components as those in the third embodiment will be omitted, and the difference between the third and fourth embodiments will mainly be described.

Figure 10:
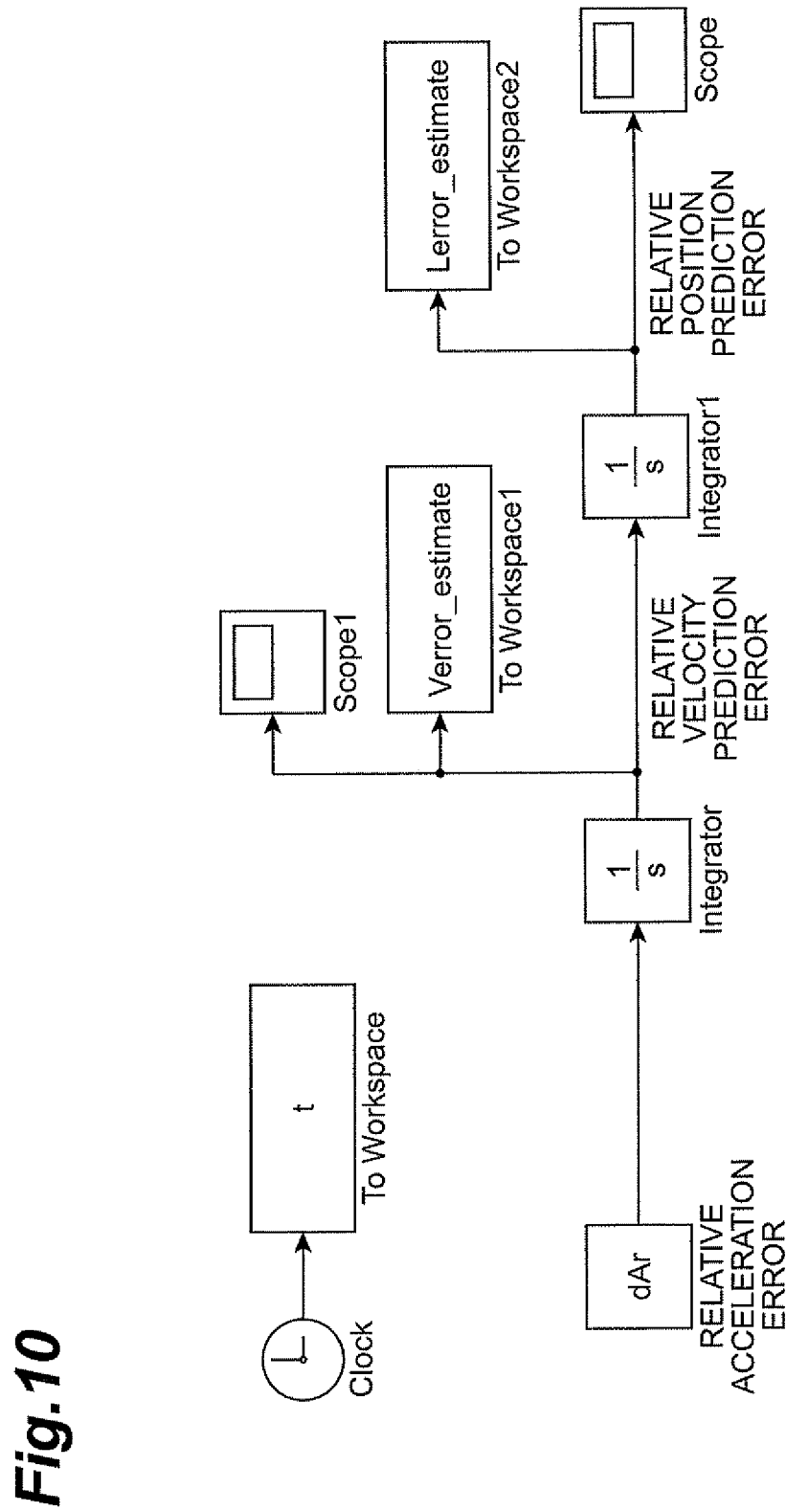
FIG. 10 is a block diagram illustrating the function of a vehicle relative position estimation apparatus according to a fourth embodiment.

A vehicle $C_n$ according to the fourth embodiment has substantially the same structure as the vehicle $C_n$ according to the first embodiment. In addition, the vehicle relative position estimation unit according to the fourth embodiment has the same structure as the vehicle relative position estimation apparatus according to the third embodiment. That is, the estimation unit 14 has a function of setting the Kalman filter gain to $L_0=0$ when the front inter-vehicle distance sensor 21a of the vehicle $C_2$ and the rear inter-vehicle distance sensor 22a of the vehicle $C_1$ are both in a lost state (XTRGT_Status: 0). In this case, the vehicle control ECU 10 has a function of changing a target inter-vehicle distance and a target relative velocity on the basis of the error of the relative position. For this function, similar to the third embodiment, a case in which two vehicles $C_1$ and $C_2$ travel in a formation will be described as an example. It is assumed that the front inter-vehicle distance sensor 21a of the vehicle $C_2$ and the rear inter-vehicle distance sensor 22a of the vehicle $C_1$ are both in a lost state (XTRGT_Status: 0). In addition, it is assumed that the accuracies (errors for the true value) of the acceleration sensors 24a provided in the vehicles $C_1$ and $C_2$ are $\pm\Delta A_1$ and $\pm\Delta A_2$, respectively. In this case, since the integrated value of the accelerations obtained by the acceleration sensors 24a provided in the vehicles $C_1$ and $C_2$ is used as the relative velocity between the vehicles $C_1$ and $C_2$, the accuracy of the relative velocity with respect to the true value can be represented by $\pm(\Delta A_1+\Delta A_2)=\pm\Delta A_r$. The vehicle control ECU 10 has a function of predicting an error in the relative velocity and the inter-vehicle distance estimated by the estimation unit 14, that is, an error $\pm\Delta A_r$ accumulated over time. For example, the vehicle control ECU 10 has a function of using the time when the estimation unit 14 starts to estimate the relative velocity and the inter-vehicle distance on the basis of acceleration in XTRGT_Status0 as an initial value, integrating $\Delta A_r$ using the time elapsed from the initial value to predict the error accumulated within the elapsed time, and changing the target relative velocity and the target inter-vehicle distance on the basis of the predicted error. FIG. 10 is a block diagram illustrating the function of the vehicle control ECU 10. As shown in FIG. 10, the estimation unit 14 stores a time t elapsed from the time when the estimation unit 14 starts to estimate the relative velocity and the inter-vehicle distance on the basis of acceleration in XTRGT_Status0, integrates the error $\Delta A_r$ of relative acceleration to calculate the accumulated error of the relative velocity, and integrates the integrated value to calculate the accumulated error of the inter-vehicle distance. A screen (Scope) shown in FIG. 10 is provided for a simulation, which will be described below. The screen may not be provided.

The vehicle control ECU 10 has a function of setting the target relative velocity and the target inter-vehicle distance so as to be equal to or greater than the accumulated error. In addition, the vehicle control ECU 10 has a function of prohibiting inter-vehicle distance control when the accumulated error is greater than a permissible error threshold value. The other functions of the vehicle control ECU 10 are the same as those of the vehicle control ECU 10 according to the third embodiment.

Figure 11:
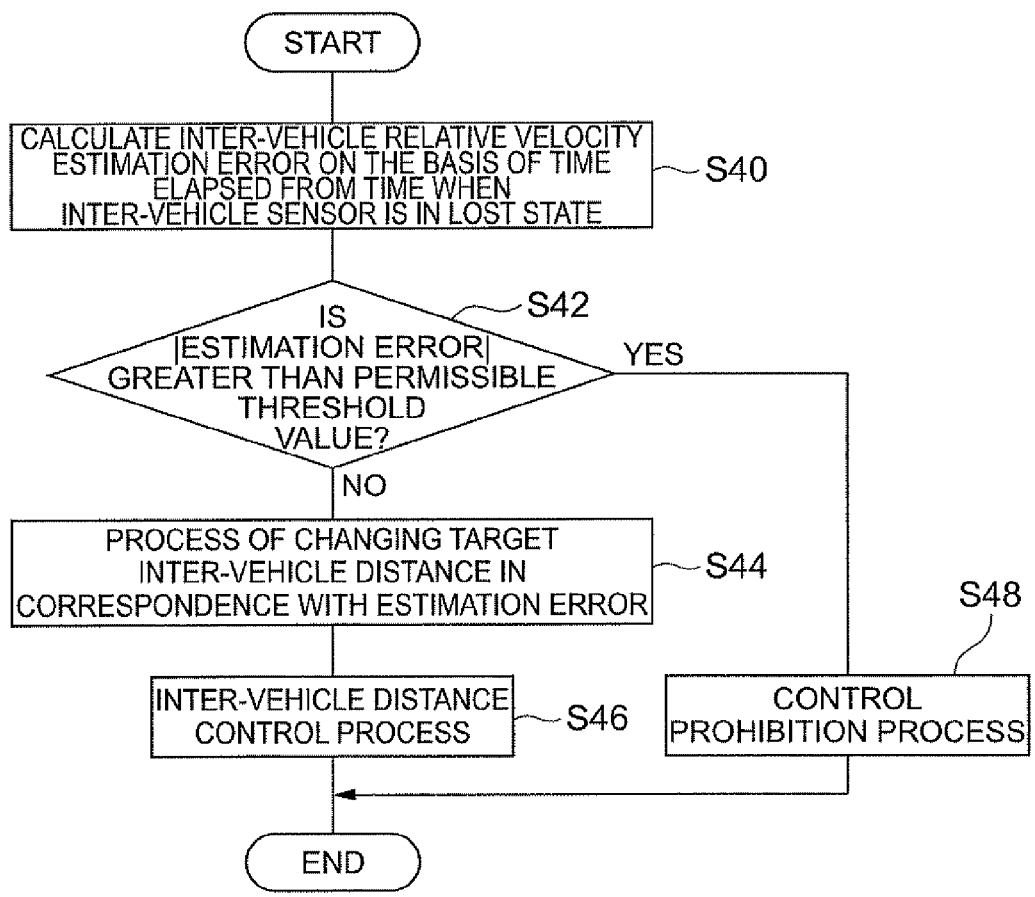
FIG. 11 is a flowchart illustrating the operation of the vehicle relative position estimation apparatus according to the fourth embodiment.

Next, the operation of the vehicle control ECU 10 will be described. FIG. 11 is a flowchart illustrating the operation of a correction unit and the vehicle control ECU 10. For example, a control process shown in FIG. 11 is repeatedly performed at a predetermined interval during the period from the time when the estimation unit 14 starts to estimate the relative velocity and the inter-vehicle distance on the basis of acceleration in XTRGT_Status0 to the end of XTRGT_Status0. For ease of understanding, a case in which two vehicles $C_1$ and $C_2$ travel in a formation will be described as an example. In addition, a case in which the vehicle $C_2$ is the subject vehicle will be described.

As shown in FIG. 11, the control process starts from an error calculation step (S40). Step S40 is performed by the vehicle control ECU 10 to calculate the accumulated error on the basis of the accuracy of the acceleration sensors 24a provided in the vehicles $C_1$ and $C_2$. The vehicle control ECU 10 integrates the error $\Delta A_r$ of relative acceleration to calculate the accumulated error of the relative velocity on the basis of the time t elapsed from the time when the estimation of the inter-vehicle distance starts. In addition, the vehicle control ECU 10 integrates the accumulated error of the relative velocity to calculate the accumulated error of the inter-vehicle distance on the basis of the time t elapsed from the time when the estimation of the inter-vehicle distance starts. When Step S40 ends, the process proceeds to a determination step (S42).

Step S42 is performed by the vehicle control ECU 10 to determine whether the error calculated in Step S40 is greater than a permissible error. For example, the vehicle control ECU 10 sets an error in the permissible range as a predetermined value in advance and determines whether the accumulated error of the inter-vehicle distance calculated in Step S40 is greater than the set predetermined value. In Step S42, when the accumulated error of the inter-vehicle distance is not greater than the set predetermined value, that is, when the error calculated in Step S40 is not greater than a permissible error, the process proceeds to a step of changing the target inter-vehicle distance (S44).

Step S44 is performed by the vehicle control ECU 10 to change the target inter-vehicle distance of the vehicle $C_2$ on the basis of the error calculated in Step S40. The vehicle control ECU 10 changes the target inter-vehicle distance so as to be equal to or greater than the accumulated error of the inter-vehicle distance calculated in Step S40. In addition, the vehicle control ECU 10 changes the target relative velocity so as to be equal to or greater than the accumulated error of the relative velocity calculated in Step S40. When Step S44 ends, the process proceeds to a vehicle control step (S46).

Step S46 is performed by the vehicle control ECU 10 to move the vehicle $C_2$ on the basis of the target inter-vehicle distance calculated in Step S44. For example, the vehicle control ECU 10 controls an engine control ECU 31, a brake control ECU 32, and a steering control ECU 33 to move the vehicle C2 on the basis of the target inter-vehicle distance and the target relative velocity changed in Step S44. When Step S46 ends, the control process shown in FIG. 11 ends.

On the other hand, in Step S42, when the accumulated error of the inter-vehicle distance is greater than the set predetermined value, that is, when the error calculated in Step S40 is greater than the permissible error, the process proceeds to a step of prohibiting vehicle control (S48). Step S48 is performed by the vehicle control ECU 10 to prohibit the control of the inter-vehicle distance. When Step S48 ends, the control process shown in FIG. 11 ends.

In this way, the control process shown in FIG. 11 ends. When the control process shown in FIG. 11 is performed, it is possible to predict an inter-vehicle distance estimated value error that increases over time according to the accuracy of the acceleration sensor 24a and change the target inter-vehicle distance so as to be equal to or greater than the predicted inter-vehicle distance estimated value error. Therefore, it is possible to ensure the safety of traveling. In addition, when the inter-vehicle distance estimated value error is greater than a permissible value, it is possible to prohibit the control of the inter-vehicle distance. It is possible to continuously perform estimation for a long time, as compared to a control operation simply performed on the basis of the time elapsed from the lost state. As a result, it is possible to improve the availability of inter-vehicle distance control.

As described above, according to the vehicle relative position estimation apparatus according to the fourth embodiment, when both the front inter-vehicle distance sensor 21a of the vehicle $C_2$ and the rear inter-vehicle distance sensor 22a of the vehicle $C_1$ are in the lost state and the relative position is estimated from the acceleration detected by the acceleration sensors 24a provided in the vehicles $C_1$ and $C_2$, the vehicle control ECU 10 can change the target relative position considering, for example, the measurement errors of the acceleration sensors 24a provided in the vehicles $C_1$ and $C_2$ and noise. Therefore, it is possible to ensure the safety of traveling.

Each of the above-described embodiments shows an example of the vehicle relative position estimation apparatus according to the invention. The vehicle relative position estimation apparatus according to the invention is not limited to the vehicle relative position estimation apparatus according to each embodiment, but the vehicle relative position estimation apparatus according to each embodiment can be changed within the scope of the claims or it may be applied to other apparatuses.

For example, in each of the above-described embodiments, the vehicle relative position estimation apparatus is provided inside the vehicle, but the invention is not limited thereto. The vehicle relative position estimation apparatus may be provided outside the vehicle.

For example, in the above-described embodiments, the relative motion estimated value is calculated using the acceleration observed by the acceleration sensors provided in the subject vehicle and other vehicles. However, the relative motion estimated value may be calculated by the acceleration request value information of the subject vehicle and other vehicles. In addition, the relative motion estimated value may be calculated on the basis of a combination of the acceleration request value and the acceleration observed by the acceleration sensor.

For example, in the first embodiment, the observation equation is established using all of the sensors of five vehicles that travel in a formation. However, one sensor that detects the relative position between at least two vehicles may be provided in one of the two vehicles whose relative distance is to be calculated.

For example, in the first embodiment, all of the vehicles that travel in a formation are processing targets. However, some of the vehicles that travel in a formation may be processing targets. The relative position estimating methods according to the above-described embodiments may be mixed in one formation.

In the above-described embodiments, information used to estimate the inter-vehicle distance is acquired by inter-vehicle communication. However, the invention is not limited to the inter-vehicle communication. For example, road-to-vehicle communication may be used.

In the above-described embodiments, the millimeter-wave radars are used as the front inter-vehicle distance sensor 21a and the rear inter-vehicle distance sensor 22a detecting the inter-vehicle distance. However, for example, an image sensor or a laser may be used.

EXAMPLES

Examples carried out by the inventors will be described in order to explain the effect of the invention.

Example 1

Figure 12:
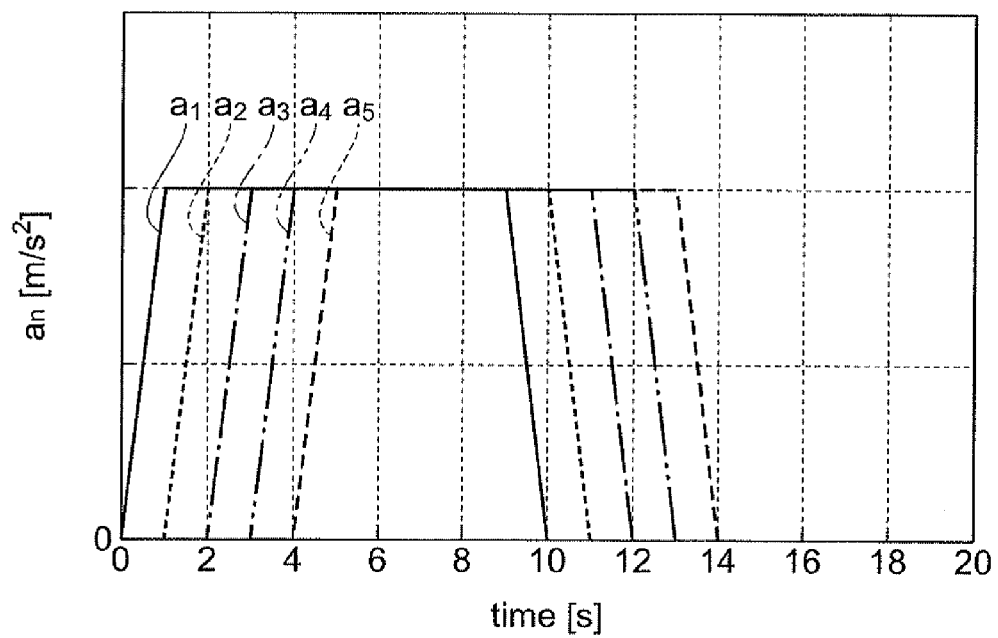
FIG. 12 is a graph illustrating the time dependence of the acceleration of a vehicle in examples.

Vehicle formation control was simulated by a vehicle formation control system for a formation including five vehicles $C_1$ to $C_5$ using a vehicle model. The structure of each vehicle was the same as that of the vehicle according to the first embodiment. In addition, an Fr millimeter-wave radar was used as the front inter-vehicle distance sensor 21a, and an Rr millimeter-wave radar was used as the rear inter-vehicle distance sensor 22a. As shown in FIG. 12, five vehicles were sequentially accelerated at an interval of 1 second from the head and reached a normal state after 10 seconds.

Figure 13:
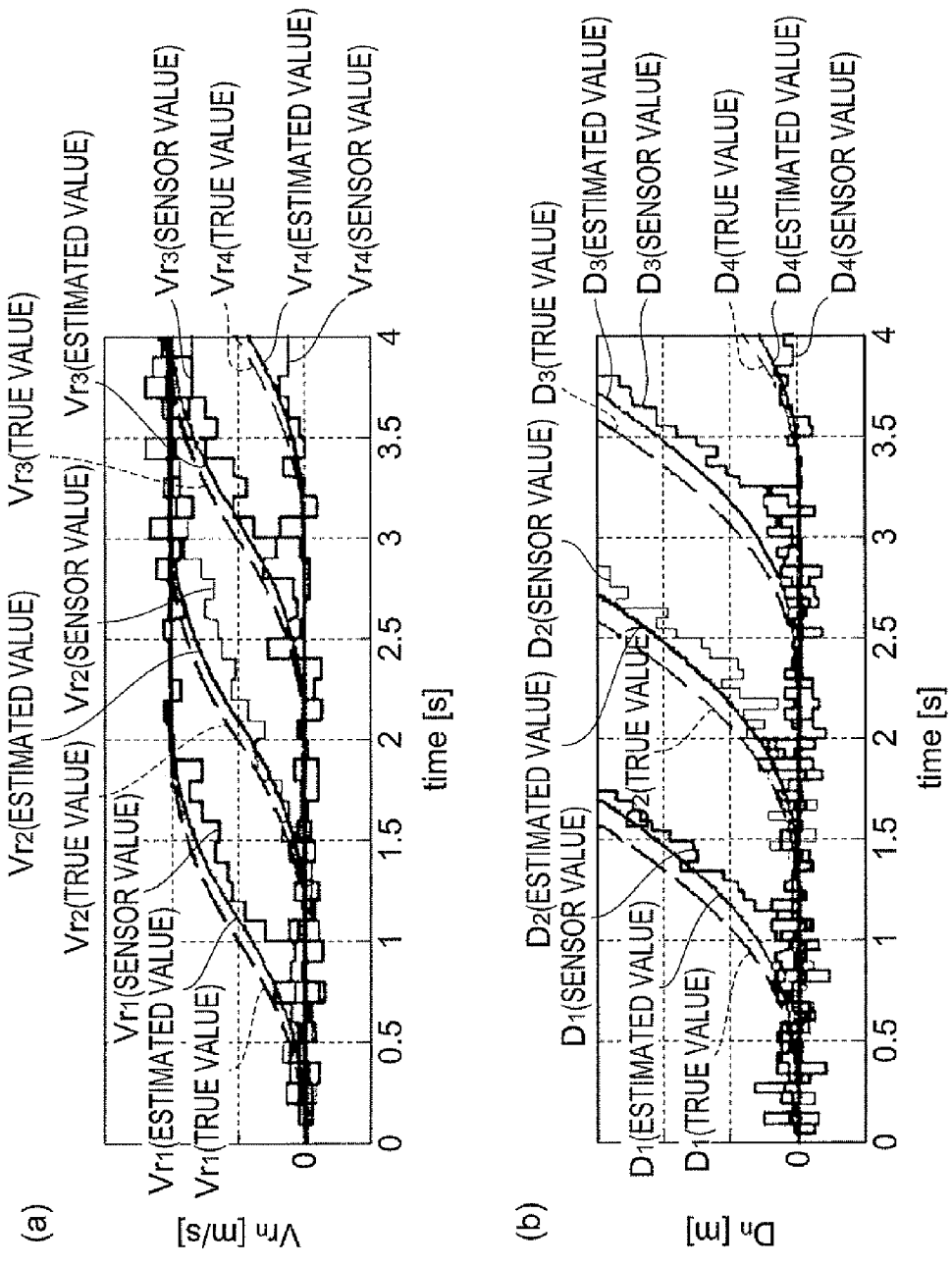
FIG. 13 is a diagram illustrating the simulation result of the estimated values of the vehicle relative position estimation apparatus according to the first embodiment.
Figure 14:
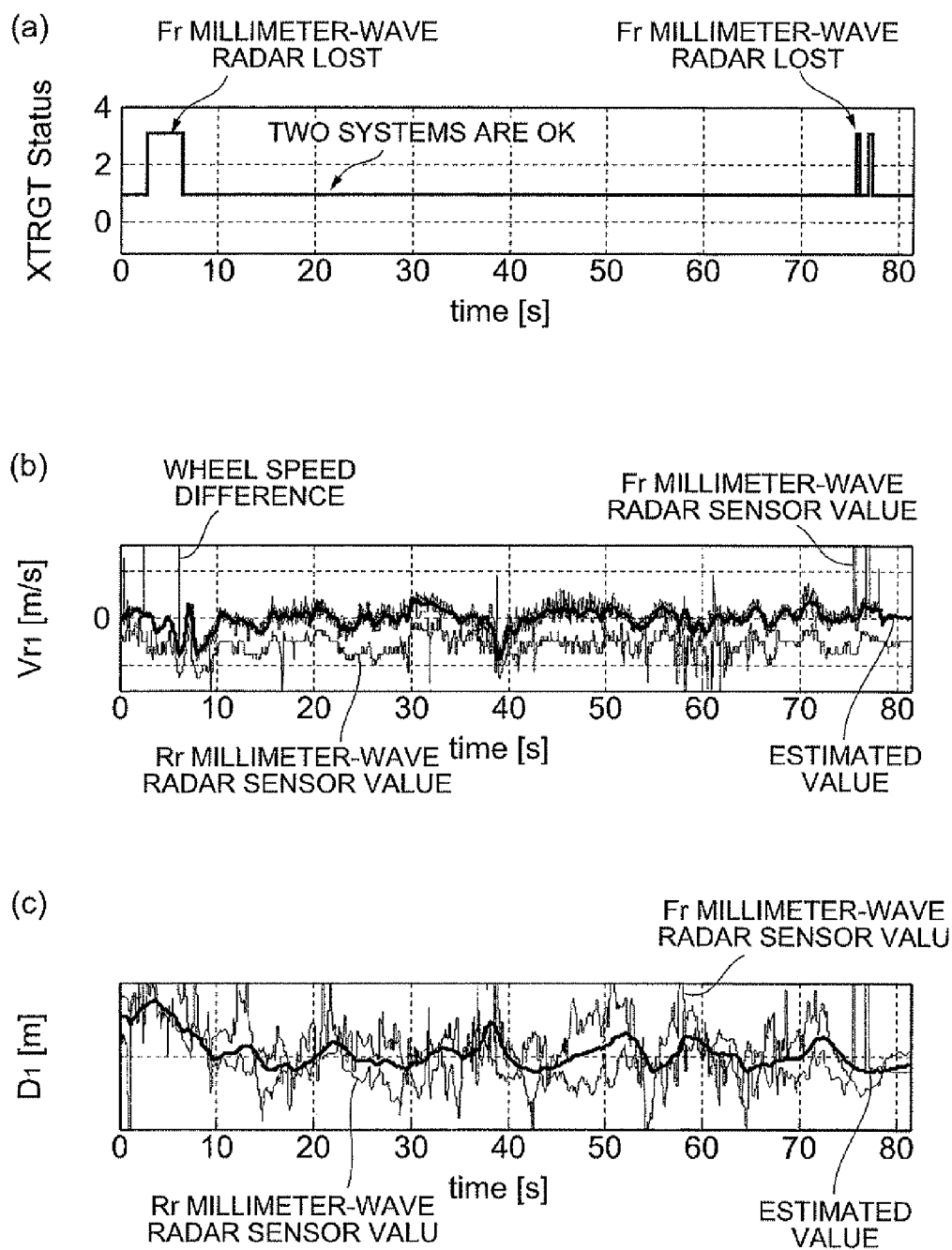
FIG. 14 is a diagram illustrating the simulation result of the estimated values of the vehicle relative position estimation apparatus according to the third embodiment.
Figure 15:
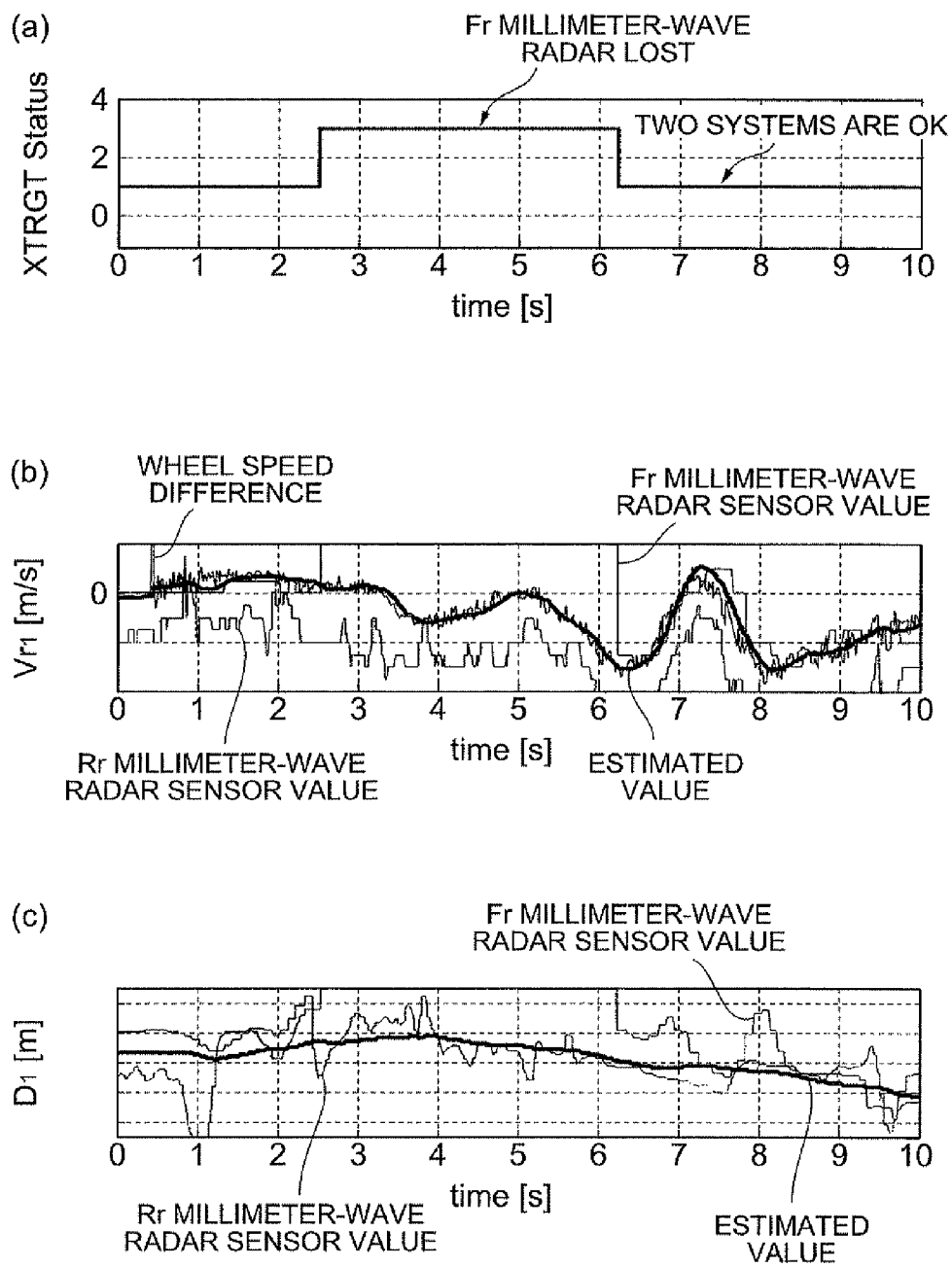
FIG. 15 is a partially enlarged view of FIG. 14.
Figure 16:
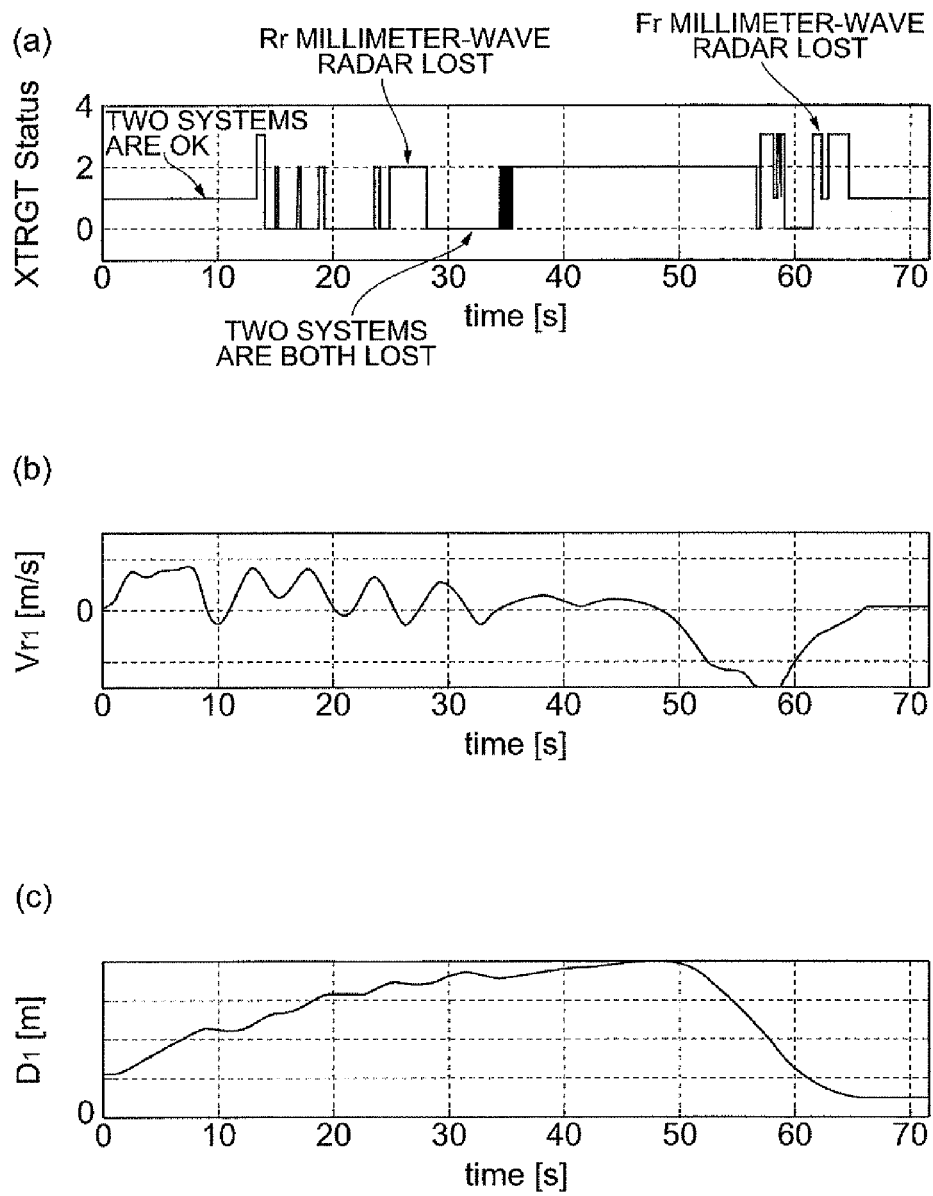
FIG. 16 is a diagram illustrating the simulation result of the estimated values of the vehicle relative position estimation apparatus according to the third embodiment.
Figure 17:
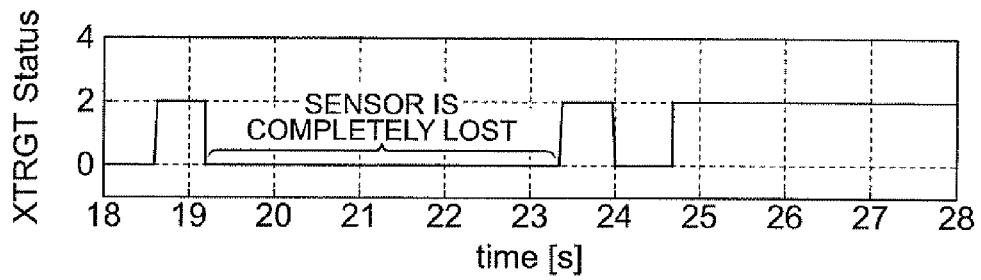
FIG. 17 is a partially enlarged view of FIG. 16.
Figure 17:
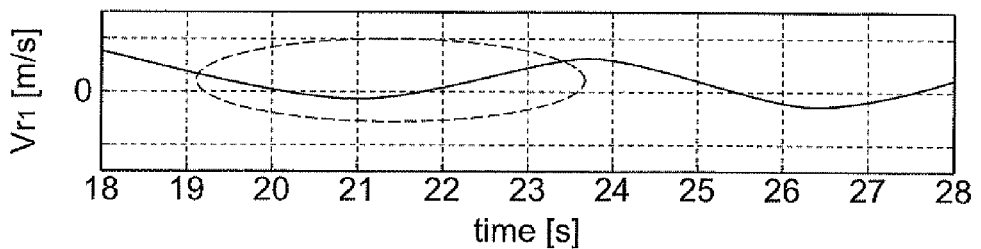
Figure 17:
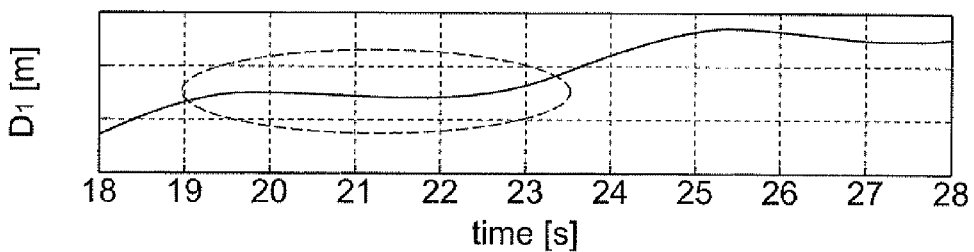

The relative position and relative velocity between the vehicles traveling under the above-mentioned conditions were estimated by the vehicle relative position estimation apparatus according to the first embodiment. The estimation result is shown in FIG. 13.

FIG. 13(a) shows the simulation result (partially enlarged graph) of the time dependence of the relative velocity $Vr_n$, and FIG. 13(b) shows the simulation result (partially enlarged graph) of the time dependence of the inter-vehicle distance $D_n$. The simulation result shown in FIG. 13(a) proved that the delay of the estimated value of the relative velocity $Vr_n$ estimated by the vehicle relative position estimation apparatus according to the first embodiment with respect to the true value was less than that of the relative velocity $Vr_n$ of the sensor value (observed value) and the estimated value of the relative velocity $Vr_n$ was closer to the true value than the relative velocity $Vr_n$ of the sensor value. The simulation result shown in FIG. 13(b) proved that the delay of the estimated value of the inter-vehicle distance $D_n$ estimated by the vehicle relative position estimation apparatus according to the first embodiment with respect to the true value was less than that of the inter-vehicle distance $D_n$ of the sensor value (observed value) and the estimated value of the inter-vehicle distance $D_n$ was closer to the true value than the inter-vehicle distance $D_n$ of the sensor value. In addition, the simulation result proved that the estimated values of the relative velocity $Vr_n$ and the inter-vehicle distance $D_n$ were smoother than the sensor values. The above-mentioned result proved that the vehicle relative position estimation apparatus according to the first embodiment could smoothly and accurately estimate the relative velocity and the inter-vehicle distance.

Example 2

The vehicles $C_1$ and $C_2$ according to the third embodiment actually traveled in a formation and the accelerations and the wheel speeds of the vehicles $C_1$ and $C_2$ and the distance and relative velocity between the vehicles $C_1$ and $C_2$ were measured by the sensors provided in the vehicles. An Fr millimeter-wave radar was used as the front inter-vehicle distance sensor 21a and an Rr millimeter-wave radar was used as the rear inter-vehicle distance sensor 22a. Then, the relative position and the relative velocity were estimated by the vehicle relative position estimation apparatus according to the third embodiment on the basis of the measured acceleration, wheel speed, inter-vehicle distance, and relative velocity. The result is shown in FIGS. 14 to 17.

FIG. 14(a) show the measurement result indicating the time dependence of the capture state of the Fr millimeter-wave radar and the Rr millimeter-wave radar that measure the relative velocity and the inter-vehicle distance. During the period for which XTRGT_Status is 1, the Fr millimeter-wave radar of the vehicle $C_2$ and the Rr millimeter-wave radar of the vehicle $C_1$ that measure the relative velocity $Vr_1$ and the inter-vehicle distance $D_1$ are both in a detecting state. During the period for which XTRGT_Status is 3, the Fr millimeter-wave radar of the vehicle $C_2$ is a lost state. FIG. 14(b) is a graph illustrating the time dependence of the relative velocity $Vr_1$ and shows the measured values (thin line) of the Fr millimeter-wave radar, the Rr millimeter-wave radar, and the difference between the wheel speeds, and the estimated values (thick line). FIG. 14(c) is a graph illustrating the time dependence of the inter-vehicle distance $D_1$, and shows the measured values of the Fr millimeter-wave radar and the Rr millimeter-wave radar and the estimated values. FIGS. 15(a) to 15(c) are partially enlarged views of FIGS. 14(a) to 14(c), respectively.

The results shown in FIGS. 14(a) to 14(c) proved that, even when the Fr millimeter-wave radar was in the lost state (for example, about 5 seconds), it was possible to estimate the relative velocity $Vr_1$ and the inter-vehicle distance $D_1$ using the Kalman filter on the basis of the value measured by the Rr millimeter-wave sensor. The result shown in FIGS. 15(a) to 15(c) proved that, even when the Fr millimeter-wave radar was in the lost state as shown in FIG. 15(a), it was possible to smoothly estimate the relative velocity $Vr_1$ and the inter-vehicle distance $D_1$ without any delay, as shown in FIGS. 15(b) and 15(c). Therefore, the above-mentioned results proved that the vehicle relative position estimation apparatus according to the third embodiment could smoothly estimate the relative velocity and the inter-vehicle distance with high robustness, according to the capture state of the sensor detecting the inter-vehicle distance.

FIG. 16(a) shows the measurement result indicating the time dependence of the capture state of the Fr millimeter-wave radar and the Rr millimeter-wave radar that measure the relative velocity and the inter-vehicle distance, similar to FIG. 14(a). During the period for which XTRGT_Status is 0, the Fr millimeter-wave radar of the vehicle $C_2$ and the Rr millimeter-wave radar of the vehicle $C_1$ that measure the inter-vehicle distance are both in a lost state. During the period for which XTRGT_Status is 2, the Rr millimeter-wave radar of the vehicle $C_1$ is in a lost state. FIG. 16(b) is a graph illustrating the time dependence of the estimated value of the relative velocity $Vr_1$. FIG. 16(c) is a graph illustrating the time dependence of the estimated value of the inter-vehicle distance $D_1$. FIGS. 17(a) to 17(c) are partially enlarged views of FIGS. 16(a) to 16(c), respectively.

The results shown in FIGS. 16(a) to 16(c) proved that, even when both the Fr millimeter-wave radar and the Rr millimeter-wave radar were in the lost state (for example, about 21 seconds), it was possible to estimate the relative velocity $Vr_1$ and the inter-vehicle distance $D_1$ using the Kalman filter on the basis of the value measured by the acceleration sensor. The result shown in FIGS. 17(a) to 17(c) proved that, even when both the Fr millimeter-wave radar and the Rr millimeter-wave radar were in the lost state as shown in FIG. 17(a), it was possible to smoothly estimate the relative velocity $Vr_1$ and the inter-vehicle distance $D_1$, as shown in FIGS. 17(b) and 17(c) (a section represented by a dotted line). Therefore, the above-mentioned results proved that the vehicle relative position estimation apparatus according to the third embodiment could smoothly estimate the relative velocity and the inter-vehicle distance with high robustness.

Example 3

Figure 18:
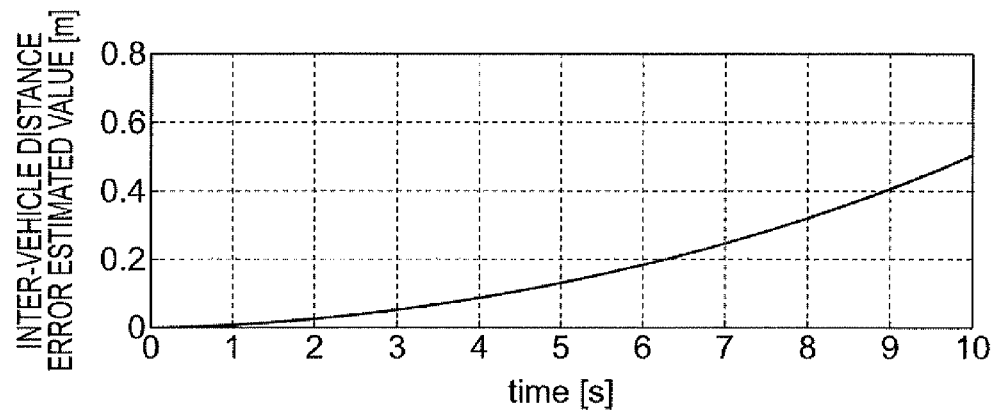
FIG. 18 is a diagram illustrating the simulation result of the accumulated error of the vehicle relative position estimation apparatus according to the fourth embodiment.
Figure 18:
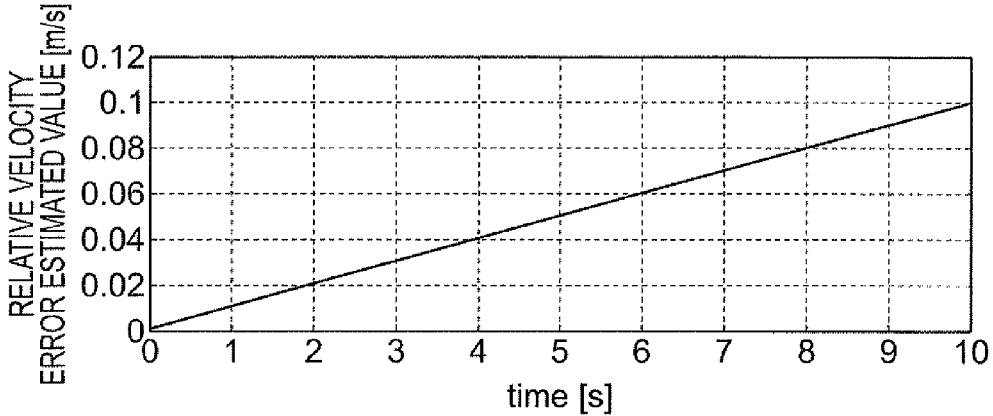
Figure 19:
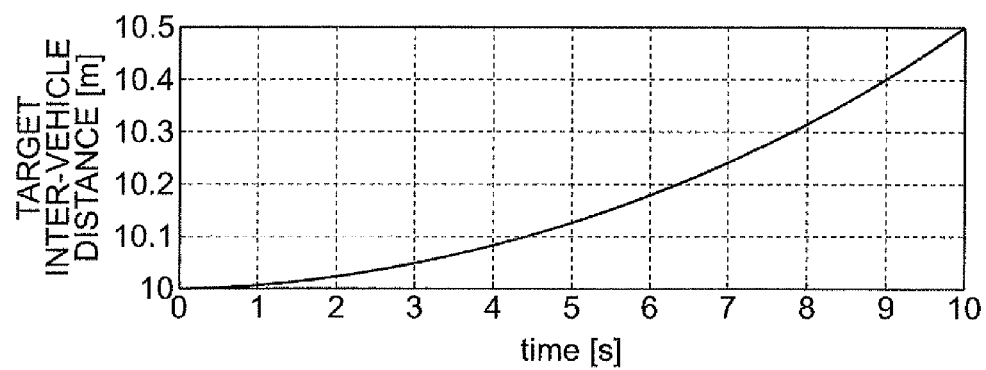
FIG. 19 is a diagram illustrating the simulation result of the target values set by the vehicle relative position estimation apparatus according to the fourth embodiment.
Figure 19:
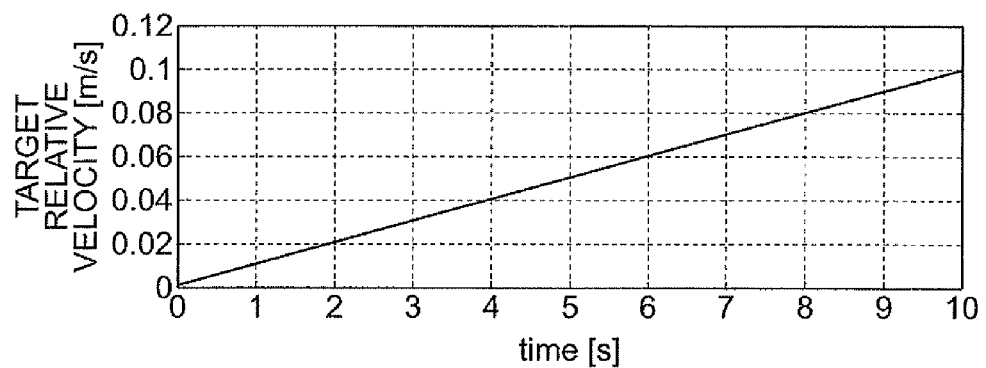

Vehicle formation control was simulated by a vehicle formation control system for a formation including two vehicles $C_1$ and $C_2$ using a vehicle model. The error $\Delta A_r$ of relative acceleration was integrated on the basis of the acceleration sensor 24a of each vehicle to calculate the error (D_error) of an inter-vehicle distance estimated value and the error (V_error) of a relative velocity estimated value depending on time. The result is shown in FIG. 18. FIG. 18(a) shows the time dependence of the error D_error of the inter-vehicle distance estimated value and FIG. 18(b) shows the time dependence of the error V_error of the relative velocity estimated value. As shown in FIG. 18(a), the errors V_error and D_error increased over time. FIGS. 19(a) and 19(b) show the target inter-vehicle distance and the target relative velocity changed by the vehicle control ECU 10 on the basis of the calculation result shown in FIG. 18. FIGS. 19(a) and 19(b) show the target inter-vehicle distance and the target relative velocity changed from the time when the Fr millimeter-wave radar and the Rr millimeter-wave radar are both in a lost state, when the vehicles travel at a target interval of 10 m. As can be seen from FIGS. 19(a) and 19(b), it was possible to ensure a safety margin and the safety of traveling by setting the target inter-vehicle distance and the target relative velocity to the estimated error or more shown in FIGS. 18(a) and 18(b).

The invention claimed is:

1. A vehicle relative position estimation apparatus that estimates the position of a first vehicle relative to a second vehicle, comprising:
   a motional state acquiring unit that acquires vehicle control information for controlling the motional state of the first vehicle and vehicle control information for controlling the motional state of the second vehicle;
   a relative position acquiring unit that acquires the relative position detected by the in-vehicle apparatus provided in the first vehicle or the second vehicle; and
   an estimation unit that receives the vehicle control information of the first vehicle and the vehicle control information of the second vehicle acquired by the motional state acquiring unit, and estimates the relative position with a Kalman filter using the relative position acquired by the relative position acquiring unit as the amount of observation, wherein
   the estimation unit changes a degree of fusion by the Kalman filter in correspondence with the capture state of the in-vehicle apparatus that is provided in the first vehicle or the second vehicle and detects the relative position between the first vehicle and the second vehicle.

2. The vehicle relative position estimation apparatus according to claim 1, wherein the motional state acquiring unit acquires acceleration as the motional state, and the relative position acquiring unit uses GPS information as the relative position.

3. The vehicle relative position estimation apparatus according to claim 1, wherein the estimation unit changes the gain of the Kalman filter that is calculated in advance, in correspondence with the capture state of the in-vehicle apparatus that is provided in the first vehicle or the second vehicle and detects the relative position.

4. The vehicle relative position estimation apparatus according to claim 1, wherein, when the relative position acquiring unit cannot acquire the relative position from the in-vehicle apparatus that is provided in the first vehicle or the second vehicle and detects the relative position, the estimation unit estimates the relative position on the basis of the vehicle control information of the first vehicle, and the vehicle control information of the second vehicle acquired by the motional state acquiring unit.

5. A vehicle relative position estimation method that estimates the position of a first vehicle relative to a second vehicle, comprising:
   a motional state acquiring step of acquiring vehicle control information for controlling the motional state of the first vehicle and vehicle control information for controlling the motional state of the second vehicle;
   a relative position acquiring step of acquiring the relative position detected by the in-vehicle apparatus provided in the first vehicle or the second vehicle; and
   an estimation step of receiving the vehicle control information of the first vehicle and the vehicle control information of the second vehicle acquired in the motional state acquiring step, and estimating the relative position with a Kalman filter using the relative position acquired in the relative position acquiring step as the amount of observation, wherein
   a degree of fusion by the Kalman filter is changed in correspondence with the capture state of the in-vehicle apparatus that is provided in the first vehicle or the second vehicle and detects the relative position between the first vehicle and the second vehicle.

6. The vehicle relative position estimation method according to claim 5, wherein, in the motional state acquiring step, an acceleration is acquired as the motional state, and in the relative position acquiring step, GPS information is used as the relative position.

* * * * *